United States Patent
Shin et al.

(10) Patent No.: US 10,788,929 B2
(45) Date of Patent: Sep. 29, 2020

(54) TOUCH DISPLAY PANEL AND TOUCH DISPLAY DEVICE

(71) Applicant: LG DISPLAY CO., LTD., Seoul (KR)

(72) Inventors: SeungMok Shin, Daegu (KR); HoonBae Kim, Seoul (KR); SunYeop Kim, Seoul (KR); SungHoon Lee, Gyeongsangbuk-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/504,783

(22) Filed: Jul. 8, 2019

(65) Prior Publication Data

US 2020/0019270 A1   Jan. 16, 2020

(30) Foreign Application Priority Data

Jul. 13, 2018  (KR) .......................... 10-2018-0081650

(51) Int. Cl.
*G06F 3/041* (2006.01)
*G06F 1/26* (2006.01)
*G06F 3/044* (2006.01)

(52) U.S. Cl.
CPC .............. *G06F 3/0416* (2013.01); *G06F 1/26* (2013.01); *G06F 3/044* (2013.01); *G06F 3/0412* (2013.01); *G06F 2203/04103* (2013.01); *G06F 2203/04114* (2019.05)

(58) Field of Classification Search
CPC combination set(s) only.
See application file for complete search history.

(56) References Cited

U.S. PATENT DOCUMENTS

| | | | |
|---|---|---|---|
| 8,766,950 B1 | 7/2014 | Morein et al. | |
| 2017/0102825 A1* | 4/2017 | Kim | ..................... G06F 3/0412 |
| 2017/0192569 A1 | 7/2017 | Jeon et al. | |
| 2018/0157355 A1 | 6/2018 | Kim | |

FOREIGN PATENT DOCUMENTS

| | | |
|---|---|---|
| CN | 103698927 A | 4/2014 |
| CN | 106569627 A | 4/2017 |
| TW | 201617816 A | 5/2016 |
| TW | I584183 B | 5/2017 |

\* cited by examiner

*Primary Examiner* — Deeprose Subedi
(74) *Attorney, Agent, or Firm* — Seed IP Law Group LLP

(57) ABSTRACT

The present disclosure relates to touch display panels and touch display devices. More specifically, the touch display panels and touch display devices provided are capable of performing display driving and touch driving simultaneously or together through a ground modulation scheme. Further, by separating a power source for driving a display controller D-CTR from a power source for driving a touch controller T-CTR, and controlling respective power sources independently, it is possible to reduce power consumption. Also, by enabling a power source for driving a ground modulation circuit to be variable, it is possible to provide functions based on touch sensing under a condition of reduced power consumption.

19 Claims, 22 Drawing Sheets

TOUCH DISPLAY PANEL AND TOUCH DISPLAY DEVICE

CROSS-REFERENCE TO RELATED APPLICATION

This application claims the priority benefit of Korean Patent Application No. 10-2018-0081650, filed on Jul. 13, 2018 in the Korean Intellectual Property Office, the disclosure of which is incorporated herein by reference in its entirety.

BACKGROUND

Technical Field

The present disclosure relates to touch display panels and touch display devices.

Description of the Related Art

As the information society has developed at a rapid rate, there is an increasing need for display devices employing advanced technologies and more efficient methods. Recently, various types of display devices, such as Liquid Crystal Display (LCD), Plasma Display Panel (PDP), and Organic Light Emitting Display (OLED) devices, have been developed and utilized.

In order to provide more various functions to a user, some touch sensing enabled display devices provide the function of detecting the touch of a user associated medium (e.g., a stylus pen or part of a user's body) on a display panel, or detecting a part of the user's body (e.g., a fingerprint) contacting or approaching the display panel, and then performing an associated operation based on the detected information.

Such a touch sensing enabled display device can provide convenience of manual input of data and commands using such a touch sensing functionality, but since the display device displays an image and senses a touch simultaneously or together, there is a problem that display driving performance or touch sensing performance can deteriorate.

For example, when display driving and touch sensing are performed in different time intervals, there is a possibility that a display driving period may be insufficient for display related operations, or a touch sensing period may be insufficient for sensing related operations. Further, there is a problem that the accuracy of touch sensing may deteriorate due to a parasitic capacitance formed between an electrode to which a signal for display driving is applied and an electrode to which a signal for touch sensing is applied.

BRIEF SUMMARY

Accordingly, the present disclosure is directed to touch display panels and touch display devices that substantially obviate one or more problems due to limitations and disadvantages of the prior art.

Various embodiments of the present disclosure provide touch display panels and touch display devices capable of performing touch sensing, irrespective of a period for performing display driving.

Various embodiments of the present disclosure provide touch display panels and touch display devices capable of preventing display driving performance or touch sensing performance from degrading even when display driving and touch sensing are performed simultaneously or together.

Various embodiments of the present disclosure provide touch display panels and touch display devices capable of reducing power consumption even when display driving and touch sensing are performed simultaneously or together.

In accordance with at least one embodiment of the present disclosure, a touch display device is provided that includes: a first power source configured to supply power to a display controller grounded at a first ground, a second power source configured to supply power to a touch controller grounded at the first ground, at least one driving circuit grounded at a second ground different from the first ground, and a ground modulation circuit configured to receive power from the first power source, and apply a modulation signal to the first ground or the second ground so that one of a first ground voltage of the first ground or a second ground voltage of the second ground can be modulated or further modulated in comparison with the other. Here, the first power source is in an on-state in a first driving mode and an off-state in a second driving mode, and the second power source is in the on-state in both the first driving mode and the second driving mode.

In accordance with another embodiment of the present disclosure, a touch display device is provided that includes: a first power source configured to supply power to a display controller grounded at a first ground, a second power source configured to supply power to a touch controller grounded at the first ground, at least one driving circuit grounded at a second ground different from the first ground, a ground modulation circuit configured to receive power from the first power source or the second power source, and apply a modulation signal to the first ground or the second ground so that one of a first ground voltage of the first ground or a second ground voltage of the second ground can be modulated or further modulated in comparison with the other, and a power switch coupled between the ground modulation circuit and each of the first power source and the second power source. Here, the first power source is in an on-state in a first driving mode and an off-state in a second driving mode, and the second power source is in the on-state in both the first driving mode and the second driving mode.

In accordance with further another embodiment of the present disclosure, a touch display panel is provided that includes: a first power source configured to supply power to a display controller grounded at a first ground, a second power source configured to supply power to a touch controller grounded at the first ground, at least one driving circuit grounded at a second ground different from the first ground, a ground modulation circuit configured to receive power from the first power source or the second power source, and apply a modulation signal to the first ground or the second ground so that one of a first ground voltage of the first ground or a second ground voltage of the second ground can be modulated or further modulated in comparison with the other, and a power switch coupled between the ground modulation circuit and each of the first power source and the second power source. Here, the first power source is in an on-state in a first driving mode and an off-state in a second driving mode and a third driving mode, and the second power source is in the on-state in the first driving mode, the second driving mode, and the third driving mode.

In accordance with embodiments of the present disclosure, by modulating a ground voltage of a touch display panel so that the modulated ground voltage can correspond to a touch driving signal applied to a touch electrode, it is possible to perform display driving and touch sensing simultaneously or together.

In accordance with embodiments of the present disclosure, by enabling a gate voltage, data voltage, or the like to be modulated for display driving through the modulation of a ground voltage of a display panel, it is possible to prevent display driving performance or touch sensing performance from degrading even when display driving and touch sensing are performed simultaneously or together.

In accordance with embodiments of the present disclosure, by separating a power source for driving a display controller from a power source for driving a touch controller, and independently controlling each power source, it is possible to reduce power consumption according driving modes of a touch display device. In accordance with embodiments of the present disclosure, by switching a power source for driving ground modulation circuit according to driving modes, it is possible to provide a touch display panel and a touch display device capable of operating in various driving modes. Additional features and advantages of the disclosure will be set forth in the description which follows and in part will be apparent from the description, or may be learned by practice of the disclosure. Other advantages of the disclosure will be realized and attained by the structure particularly pointed out in the written description and claims hereof as well as the appended drawings.

DETAILED DESCRIPTION

Figure 1:
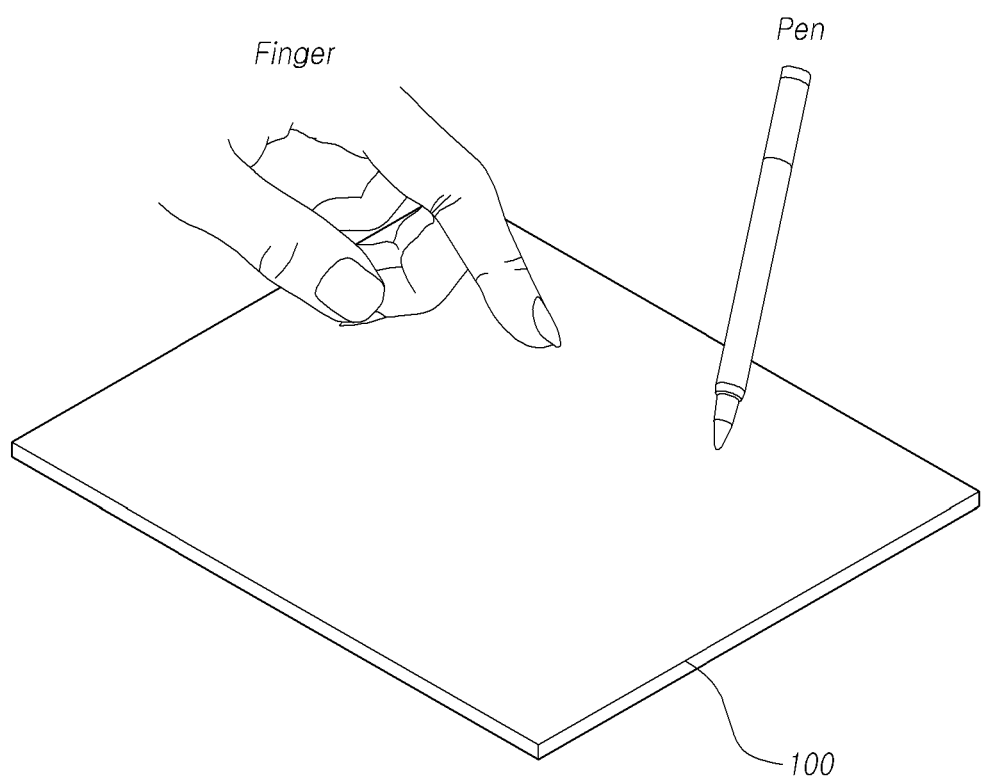
FIG. 1 is a diagram schematically illustrating a touch display device according to embodiments of the present disclosure.

Hereinafter, embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

Terms, such as first, second, A, B, (a), or (b) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

FIG. 1 is a diagram illustrating a touch display device 100 according to embodiments of the present disclosure.

In accordance with embodiments of the present disclosure, the touch display device 100 can provide, as well as a function of displaying an image, a function of detecting a touch by a user associated medium (e.g., a pen or part of a user's body).

Here, the pen can include an active pen having signal transmission and reception functions, performing associated operations with the touch display device 100, or having an internal battery or power source, and a passive pen not having signal transmission and reception functions and an internal battery or power source.

The touch display device 100 herein may be, for example, a television (TV), a monitor, or a mobile device such as a tablet, a smart phone, or the like.

The touch display device 100 herein can include a display part for providing an image display function, and a touch sensing part for touch sensing.

Hereinafter, referring to FIGS. 2, 3 and 4, discussions are conducted on structures of the display part and the touch sensing part of the touch display device 100.

Figure 2:
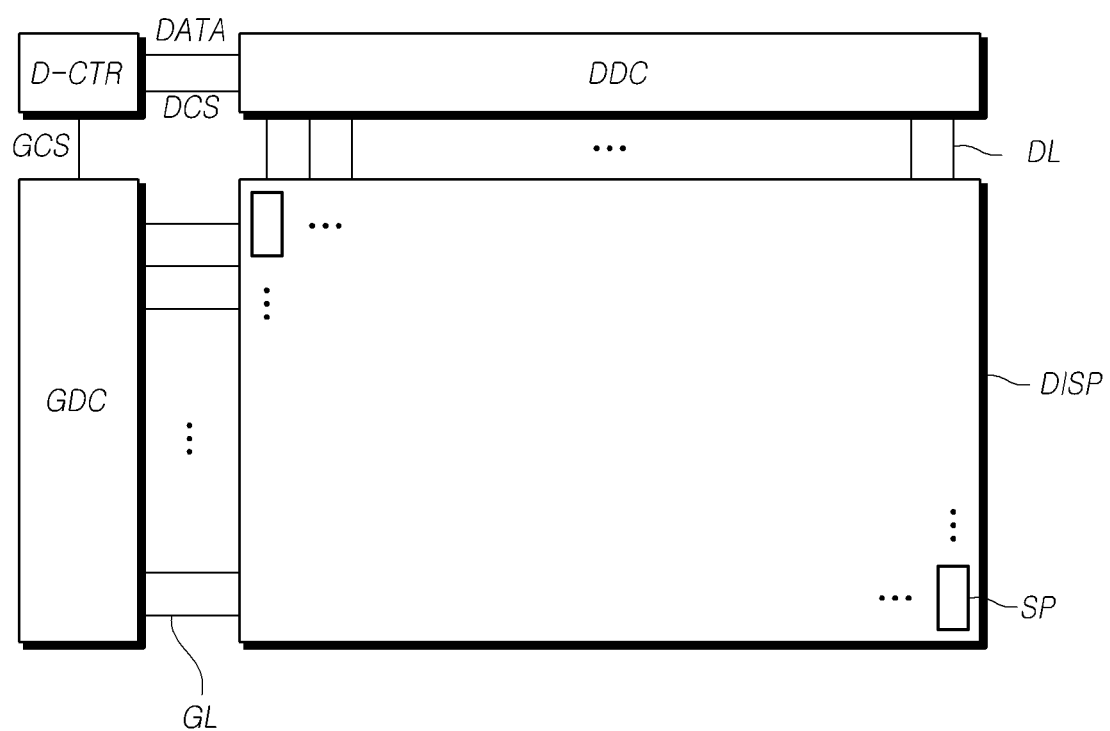
FIG. 2 is a diagram illustrating a display part in the touch display device according to embodiments of the present disclosure.

FIG. 2 is a diagram illustrating the display part in the touch display device 100 according to embodiments of the present disclosure.

Referring to FIG. 2, the display part of touch display device 100 herein can include a display panel DISP, a data driving circuit DDC, a gate driving circuit GDC, a display controller D-CTR, and the like.

The display panel DISP can include a plurality of data lines DL and a plurality of gate lines GL, and a plurality of subpixel SP defined by the plurality of data lines DL and the plurality of gate lines GL.

The data driving circuit DDC drives the plurality of data lines DL by supplying one or more data voltages to the plurality of data lines DL.

The gate driving circuit GDC drives the plurality of gate lines GL by sequentially supplying one or more scan signals to the plurality of gate lines GL.

The display controller D-CTR controls operations of the data driving circuit DDC and the gate driving circuit GDC by supplying respective control signals (DCS, GCS) to the data driving circuit DDC and the gate driving circuit GDC.

The display controller D-CTR starts a scanning operation according to a timing processed in each frame, converts image data DATA inputted from external devices or other image providing sources to a data signal form used in the data driving circuit DDC and then outputs image data DATA resulted from the converting, and controls the driving of at least one data line DL at a pre-configured time according to the scanning operation.

The display controller D-CTR may be a timing controller used in the typical display technology or a control apparatus/device capable of additionally performing other control functionalities in addition to the typical function of the timing controller.

The display controller D-CTR may be implemented as a separate unit from the data driving circuit DDC, or implemented as an integrated circuit in conjunction with the data driving circuit DDC.

The data driving circuit DDC can be implemented by including at least one source driver integrated circuit.

Each source driver integrated circuit can include a shift register, a latch circuit, a digital to analog converter, an output buffer, or the like.

In some instances, each source driver integrated circuit may further include one or more analog to digital converters.

The gate driving circuit GDC can be implemented by including at least one gate driver integrated circuit.

Each gate driver integrated circuit can include a shift register, a level shifter, and the like.

The data driving circuit DDC can be located on, but not limited to, one side (e.g., an upper side or a lower side) of the display panel DISP, or in some instances, be located on, but not limited to, two sides (e.g., the upper side and the lower side) of the display panel DISP according to driving schemes, panel design schemes, or the like.

The gate driving circuit GDC can be located on, but not limited to, one side (e.g., a left side or a right side) of the display panel DISP, or in some instances, be located on, but not limited to, two sides (e.g., a left side and a right side) of the display panel DISP according to driving schemes, panel design schemes, or the like.

Meanwhile, the display panel DISP can be various types of display panels, such as, a liquid crystal display panel, a plasma display panel, and an organic light emitting display panel, or the like.

Figure 3:
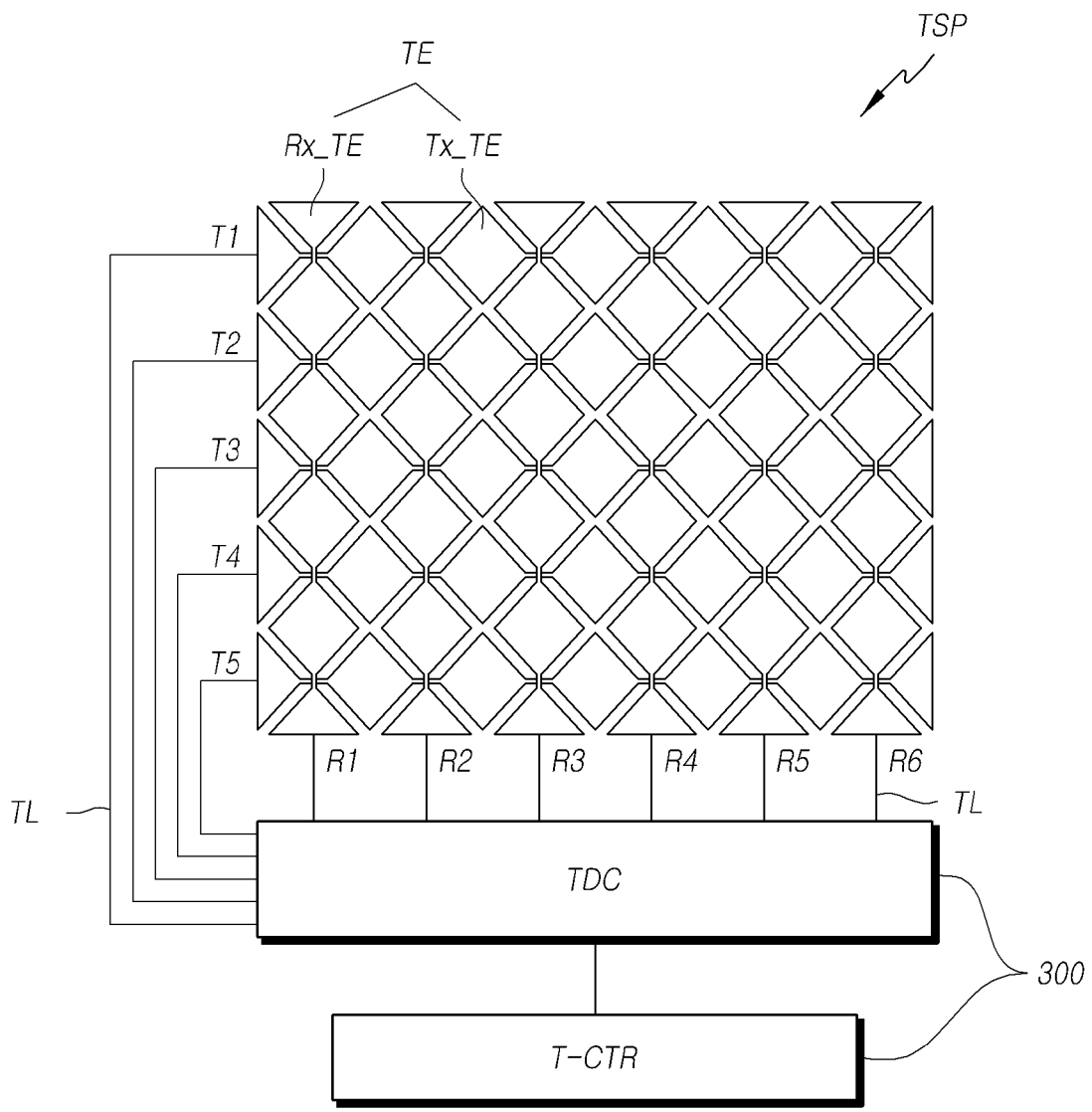
FIG. 3 is a diagram illustrating a touch sensing part for mutual-capacitance based touch sensing in the touch display device according to embodiments of the present disclosure.
Figure 4:
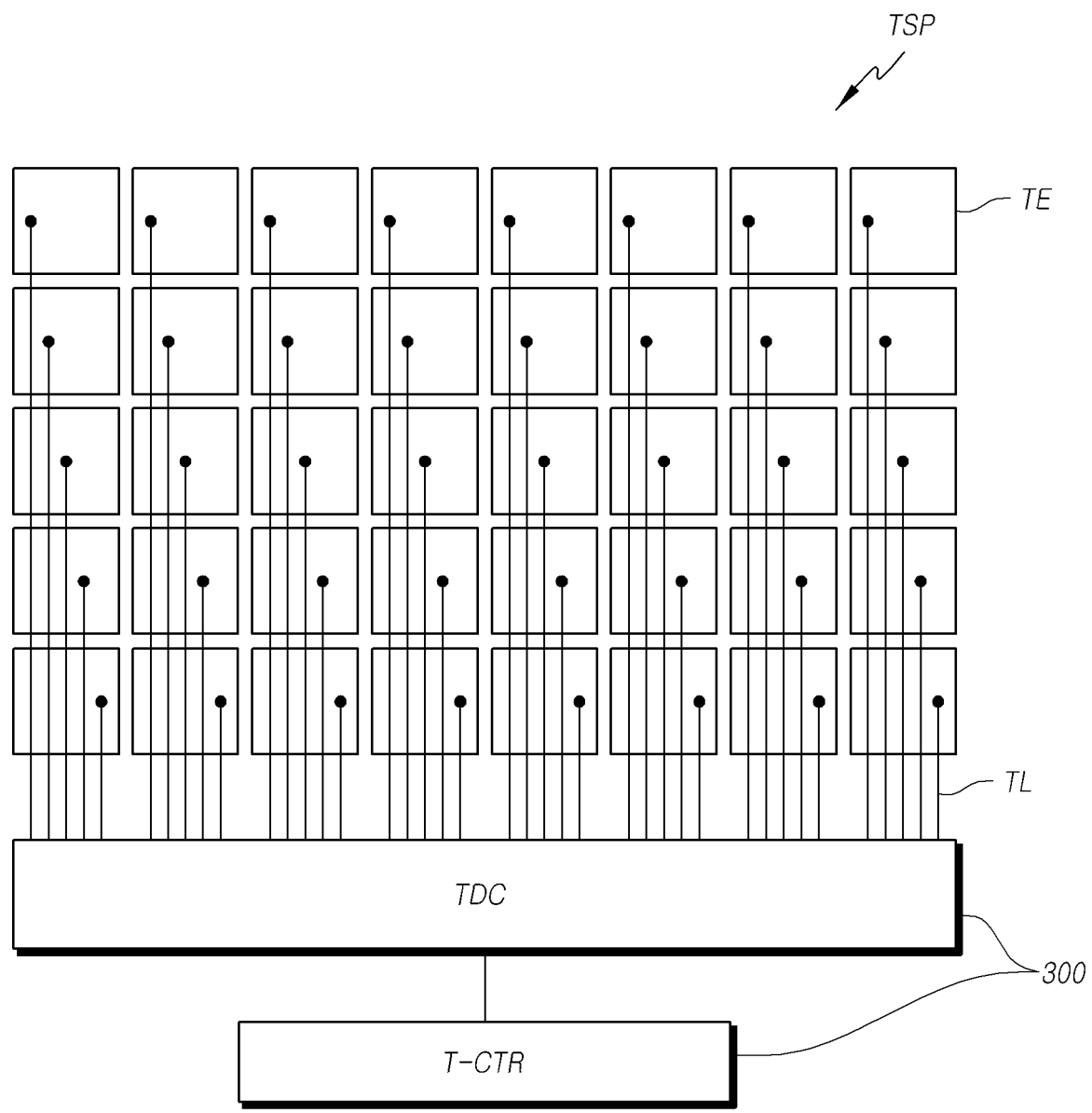
FIG. 4 is a diagram illustrating a touch sensing part for self-capacitance based touch sensing in the touch display device according to embodiments of the present disclosure.
Figure 5:
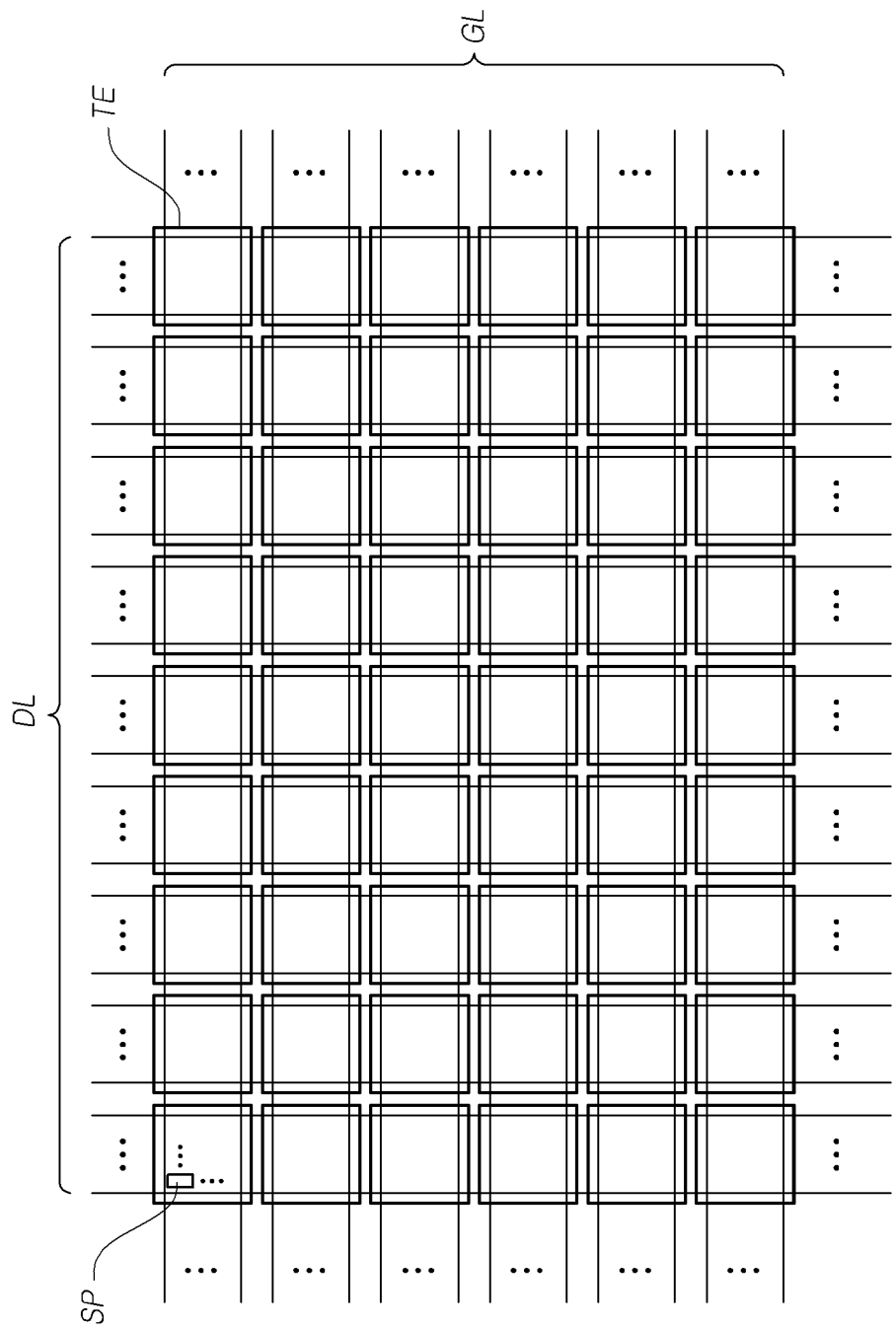
FIG. 5 is a diagram illustrating a touch screen panel integrated display panel in the touch display device according to embodiments of the present disclosure.

FIGS. 3 and 4 are diagrams illustrating two types of touch sensing parts in the touch display device 100 according to embodiments of the present disclosure. FIG. 5 is a diagram illustrating a relationship between signal lines DL and GL in the display panel DISP and touch electrodes TE in a touch screen panel TSP in the touch display device 100 according to embodiments of the present disclosure.

As illustrated in FIGS. 3 and 4, in order to sense a touch input by a user associated medium (e.g., a pen or part of a user's body including a finger or the like), the touch display device 100 herein can include the touch screen panel TSP including touch electrodes TE and a touch circuit 300 for driving the touch screen panel TSP.

The touch display device 100 can provide a mutual-capacitance based touch sensing functionality of measuring a capacitance or an its variance formed between two types of touch electrodes (Tx_TE, Rx_TE) in the touch screen panel TSP shown in FIG. 3, and sensing a corresponding touch input based on the measurements.

Further, the touch display device 100 can provide a self-capacitance based touch sensing functionality of measuring a capacitance or an its variance formed in each touch electrode TE in the touch screen panel TSP shown in FIG. 4, and sensing a corresponding touch input based on the measurements.

Referring to FIG. 3, for the mutual-capacitance based touch sensing, a plurality of first touch electrode lines (T1~T5, may be referred to as "touch driving lines") to which a touch driving signal is applied and a plurality of second touch electrode lines (R1~R6, may be referred to as "touch sensing lines") to which a touch sensing signal is applied, which intersect each other, are disposed in the touch screen panel TSP.

Each of the first touch electrode lines (T1~T5) may be an electrode in the form of a bar extending in the horizontal direction. Each of the second touch electrode lines (R1~R6) may be an electrode in the form of a bar extending in the vertical direction.

Alternatively, as shown in FIG. 3, each of the first touch electrode lines (T1~T5) may be formed by electrical connection of first touch electrodes (Tx_TE, may be referred to as "touch driving electrodes") disposed an identical row to one another. Each of the second touch electrode lines (R1~R6) may be formed by electrical connection of second touch electrodes (Rx_TE, may be referred to as "touch sensing electrodes") disposed an identical column to one another.

Each of the first touch electrode lines (T1~T5) can be electrically connected to a touch circuit 300 through one or more touch lines TL. Each of the second touch electrode lines (R1~R6) can be electrically connected to a touch circuit 300 through one or more touch lines TL.

Referring to FIG. 4, for the self-capacitance based touch sensing, a plurality of touch electrodes TE can be disposed in the touch screen panel TSP.

A touch driving signal can be applied to each of the plurality of touch electrodes TE, and a touch sensing signal can be sensed from each of the plurality of touch electrodes TE.

Each of the plurality of touch electrodes TE can be electrically connected to the touch circuit 300 through one or more touch lines TL.

In order to discuss the arrangement of the touch electrodes TE and the touch lines TL more specifically, a first touch electrode and a second touch electrode which are located in an identical column direction may be defined.

A first touch line connected to the first touch electrode can overlap the second touch electrode and be insulated from the second touch electrode within the touch screen panel TSP.

The second touch line connected to the second touch electrode can be insulated from the first touch line within the touch screen panel TSP.

Hereinafter, for convenience of description, it is assumed that the touch display device 100 operates in the self-capacitance based touch sensing scheme, and the touch screen panel TSP is also designed as shown in FIG. 4 for the self-capacitance based touch sensing.

The shapes of one touch electrode TE shown in FIGS. 3 and 4 are merely examples for convenience of description. Embodiments of the present disclosure are not limited thereto; the touch electrode TE may have various shapes.

The size of an area in which one touch electrode TE is formed may correspond to the size of an area in which one subpixel SP is formed.

Alternatively, as shown in FIG. 5, the size of an area in which one touch electrode TE is formed may be greater than the size of an area in which one subpixel SP is formed.

In this case, the one touch electrode TE may overlap wholly or at least in part two or more data lines DL and two or more gate lines GL.

The first touch electrode and the second touch electrode located in an identical column direction in the plurality of touch electrodes TE are arranged such that the first touch electrode can overlap wholly or at least in part two or more data lines DL and two or more gate lines GL, and the second touch electrode can overlap wholly or at least in part two or more data lines DL and two or more gate lines GL.

The two or more data lines DL overlapping the first touch electrode may be identical to the two or more data lines DL overlapping the second touch electrode. The two or more gate lines GL overlapping the first touch electrode may be different from the two or more gate lines GL overlapping the second touch electrode.

A third touch electrode and a fourth touch electrode located in an identical row direction in the plurality of touch electrodes TE are arranged such that the third touch electrode can overlap wholly or at least in part two or more data lines DL and two or more gate lines GL, and the fourth touch electrode can overlap wholly or at least in part two or more data lines DL and two or more gate lines GL.

The two or more data lines DL overlapping the third touch electrode may be different from the two or more data lines DL overlapping the fourth touch electrode. The two or more gate lines GL overlapping the third touch electrode may be identical to the two or more gate lines GL overlapping the fourth touch electrode.

According to the size of an area in which one touch electrode TE is formed, one touch electrode TE may correspond to the size of areas in which several to several tens of subpixel SP are formed.

Meanwhile, the touch screen panel TSP may be fabricated separately from the display panel DISP and then coupled to the display panel DISP (may be referred to as "add-on type"), or be integrated in the display panel DISP (may be referred to as "in-cell type" or "on-cell type").

Integrating the touch screen panel TSP into the display panel DISP encompasses integrating touch electrodes TE and touch lines TL into the display panel DISP.

Meanwhile, as shown in FIGS. 3 and 4, the touch circuit 300 can include one or more touch driving circuits TDC supplying touch driving signals to the touch screen panel TSP and detecting (receiving) touch sensing signals from the touch screen panel TSP, and a touch controller T-CTR detecting the presence or absence of a touch input and/or the location of the touch input using a result of the touch sensing detection by the one or more touch driving circuits TDC.

The one or more touch driving circuits TDC and the touch controller T-CTR may be implemented as separate components, or be integrated together as one component.

Meanwhile, the touch driving circuit TDC and the data driving circuit DDC may be integrated together to form one or more integrating integrated circuits SRIC. That is, the touch display device 100 may include one or more integrating integrated circuits SRIC, and each integrating integrated circuits SRIC can include one or more touch driving circuits TDC and one or more data driving circuits DDC.

Thus, integrating together the touch driving circuit TDC for touch driving and the data driving circuit DDC for data driving allows the touch driving and the data driving to be effectively performed in case where the touch screen panel TSP is integrated into the display panel DISP, that is, the in-cell type or the on-cell type, and touch lines TL connected to the touch electrodes TE are disposed in parallel to the data lines DL.

Meanwhile, in the case of the in-cell type or the on-cell type, in which the touch screen panel TSP is integrated into the display panel DISP, the touch electrode TE may be formed of various patterns or configurations.

When the touch display device 100 is implemented as a liquid crystal display device type, or the like, the touch electrode TE can be a common electrode to form an electric field with a pixel electrode of each subpixel SP.

For example, when display driving for displaying images and touch driving for sensing a touch are performed according to divided time intervals, the touch electrode TE may be blocked common electrodes for applying a touch driving signal or detecting a touch sensing signal during a touch driving interval, and applying a common voltage during a display driving interval.

In this case, during the display driving interval, all touch electrodes TE are electrically connected within the touch circuit 300, and receive commonly a common voltage.

During the touch driving interval, all or one or more of touch electrodes TE are selected within the touch circuit 300, and a touch driving signal is applied to the one or more selected touch electrodes TE by the touch driving circuit TDC of the touch circuit 300, or a touch sensing signal can be detected from the one or more selected touch electrodes TE by the touch driving circuit TDC of the touch circuit 300.

Another example, when display driving for displaying images and touch driving for sensing a touch are performed simultaneously, a touch driving signal applied to the first touch electrode and the second touch electrode may be a voltage forming a capacitance with a data voltage supplied each of two or more subpixels SP overlapping the first touch electrode, and at the same time, may be a voltage forming a capacitance with a data voltage supplied each of two or more subpixels SP overlapping the second touch electrode.

Further, each touch electrode TE may include a plurality of slits (holes) for forming electric fields pixel electrodes in a plurality of subpixels SP overlapping each touch electrode TE.

Meanwhile, when the touch display device 100 is implemented as an organic light emitting display device, a plurality of touch electrodes TE and a plurality of touch lines TL are located over an encapsulation layer over the display panel DISP. Here, the encapsulation layer is disposed wholly or at least in part over the display panel DISP, and disposed over one or more common electrodes (e.g., cathode electrodes, etc.) to which a common voltage is applied.

The one or more common electrodes disposed wholly or at least in part over the display panel DISP may be a cathode electrode of an anode electrode and a cathode electrode of an organic light emitting diode (OLED) within each subpixel SP, and the common voltage may be a cathode voltage.

In this case, each of the plurality of touch electrodes TE may be a bulk-type electrode without an open area. Here, each of the plurality of touch electrodes TE may be a transparent electrode so that light emitted from subpixels SP may pass through the touch electrodes TE.

Further, each of the plurality of touch electrodes TE may be a mesh-type electrode with several open areas. In this case, each open area in each of the plurality of touch electrodes TE may correspond to a light emitting area (e.g., an area in which a part of an anode electrode is located) of the subpixel SP.

Hereinafter, it is assumed that the touch screen panel TSP is integrated into the display panel DISP. Hereinafter, the touch screen panel integrated display panel DISP is referred to as a touch display panel.

Figure 6:
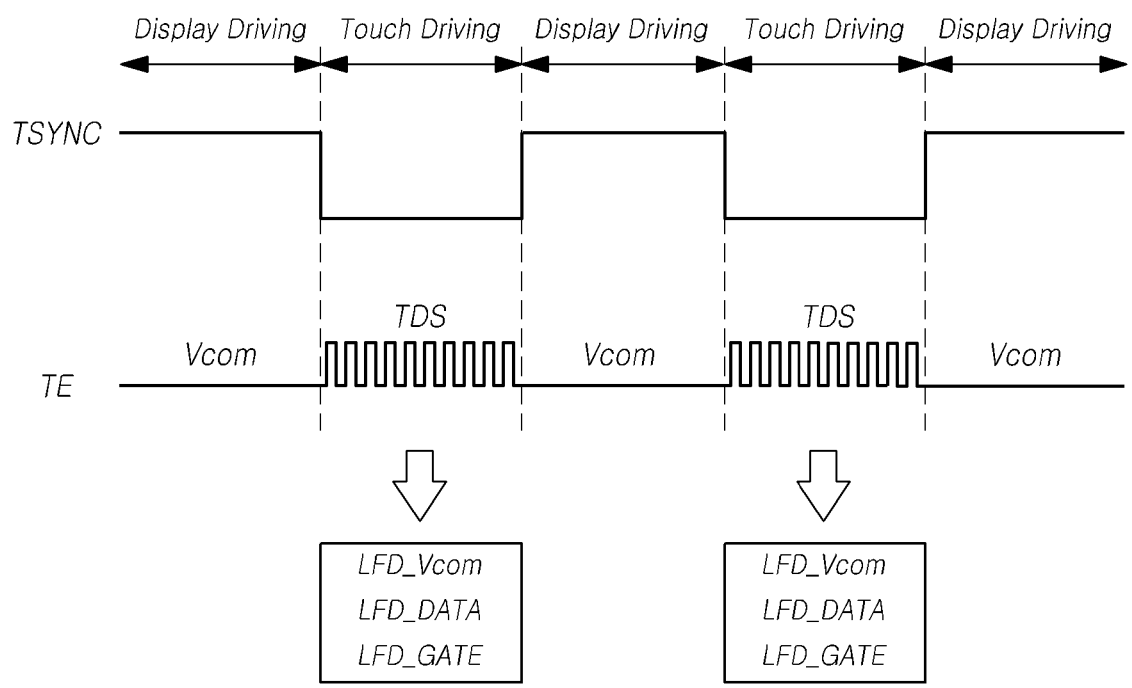
FIG. 6 is a diagram illustrating a time division driving scheme in the touch display device according to embodiments of the present disclosure.

FIG. 6 is a diagram illustrating a time division driving scheme in the touch display device 100 according to embodiments of the present disclosure.

Referring to FIG. 6, touch display device 100 in accordance with embodiments of the present disclosure can perform display driving and touch driving by time division. Such a driving scheme is referred to as a time division driving scheme.

The touch display device 100 in accordance with embodiments of the present disclosure can use a synchronization signal TSYNC for differentiating between a display driving interval and a touch driving interval.

For example, in the synchronization signal TSYNC, a first level (e.g., a high level) can represent the display driving interval, and a second level (e.g., a low level) can represent the touch driving interval.

During the touch driving interval, all or at least one of the touch electrodes TE are applied with touch driving signals TDS. During the display driving interval, the touch electrodes TE can be floated or grounded, or a specific DC voltage can be applied to at least one of the touch electrodes TE.

When the touch electrode TE also serves as a common electrode for display driving, a common voltage Vcom for display driving can be applied to the touch electrode TE during the display driving interval, and a touch driving signal TDS can be applied to the touch electrode TE during the touch driving interval.

During the touch driving interval, the touch driving signal TDS applied to the touch electrode TE may be a DC voltage, or be a signal with a variable voltage level. When the touch driving signal TDS is the signal with a variable voltage level, the touch driving signal TDS may be referred to as a modulation signal, a pulse signal, an AC signal, or the like.

Meanwhile, during the touch driving interval, the touch electrode TE may form a parasitic capacitance with other electrodes in a peripheral area while a touch driving signal TDS is applied to the touch electrode TE that may be the common electrode. Such a parasitic capacitance may reduce touch sensitivity.

Accordingly, during the touch driving interval, the touch display device 100 may apply a load-free driving signal LFD to other electrodes in the peripheral area of the touch electrode TE while the touch driving signal TDS is applied to the touch electrode TE that may be the common electrode.

The load-free driving signal LFD may be the touch driving signal TDS, or a signal corresponding in at least one of a frequency, a phase, a voltage polarity, an amplitude, or the like to the touch driving signal TDS. In one embodiment, the load-free driving signal LFD and the touch driving signal TDS have the same frequency, phase, voltage polarity, and/or amplitude.

Other electrodes in the peripheral area of the touch electrode TE may be at least one data line DL, at least one gate line GL, other at least one touch electrode TE, or the like, or may be all electrodes or signal lines near or around the touch electrode TE.

During the touch driving interval, while the touch driving signal TDS is applied to the touch electrode TE, a load-free driving signal LFD_DATA may be applied to at least one data line DL in the peripheral area of the touch electrode TE, or all data lines DL in the display panel DISP.

During the touch driving interval, while the touch driving signal TDS is applied to the touch electrode TE, a load-free driving signal LFD_GATE may be applied to at least one gate line GL in the peripheral area of the touch electrode TE, or all gate lines GL in the display panel DISP.

During the touch driving interval, while the touch driving signal TDS is applied to the touch electrode TE, a load-free driving signal LFD_Vcom may be applied to at least one touch electrode TE in the peripheral area of the touch electrode TE, or all remaining touch electrodes TE in the display panel DISP.

When the touch display device 100 herein is driven in the time division driving scheme, since a frame period is divided into the display driving interval and the touch driving interval; therefore, the divided driving interval may not be sufficient for driving images.

Such an insufficiency of the display driving time may cause a situation where a capacitor for image display (e.g., a capacitor between a pixel electrode and a common electrode) cannot be charged properly.

When the touch display device 100 herein is driven in the time division driving scheme, time for touch driving as well as time for display driving becomes insufficient; therefore, a rate and accuracy of touch sensing may be reduced.

In addition, when the touch display device 100 herein is driven in the time division driving scheme, it additionally employs a power integrated circuit for generating a touch driving signal TDS and a load-free driving signal LFD.

Thus, touch display device 100 in accordance with embodiments of the present can perform display driving and touch driving using a different driving scheme from the time division driving scheme.

In order for the touch display device 100 herein to perform display driving and touch driving simultaneously or together, driving operation is performed such that undesired mutual influence between the display driving and the touch driving is overcome or prevented. Hereinafter, discussions will be conducted on operations and/or configurations for performing the display driving and the touch driving simultaneously or together.

Figure 7:
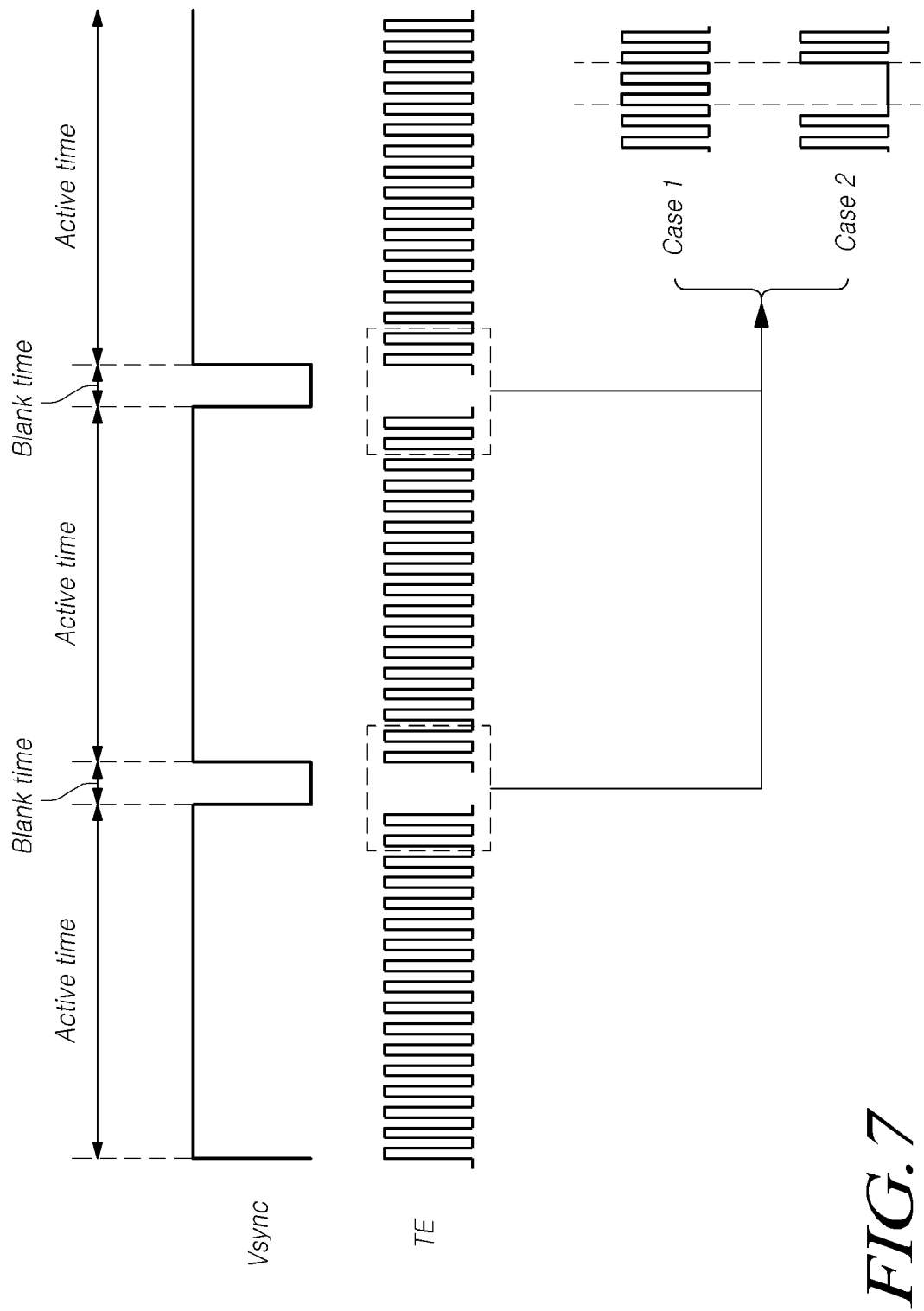
FIG. 7 is a diagram illustrating a time free driving scheme in the touch display device according to embodiments of the present disclosure.

FIG. 7 is a diagram illustrating a time free driving scheme in the touch display device 100 according to embodiments of the present disclosure.

Referring to FIG. 7, touch display device 100 in accordance with embodiments of the present disclosure can perform the display driving and the touch driving simultaneously or together. Such a driving scheme is referred to as a time free driving scheme.

The touch display device 100 in accordance with embodiments of the present disclosure does not require the synchronization signal TSYNC for differentiating between the display driving interval and the touch driving interval.

When the touch display device 100 herein performs the time free driving, the touch display device 100 can perform the display driving and the touch driving for an active time interval of the active time interval and a blank time interval defined by a vertical synchronous signal Vsync. Here, one active time interval can correspond to one display frame time interval.

Accordingly, when the touch display device 100 herein performs the time free driving, for the active time interval defined by the vertical synchronous signal Vsync, for display driving, the touch display device 100 can supply data voltages for image display to a plurality of data lines DL, while sequentially driving a plurality of gate lines GL, and in the same active time interval, supply touch driving signals TDS to a plurality of touch electrodes TE for touch driving.

Accordingly, since the touch display device 100 herein is performed in the time free driving scheme, it is possible to sense a touch input or a touch gesture on the display panel DISP by a user associated medium (e.g., a pen or part of a user's body), while displaying images through display driving.

Meanwhile, the touch display device 100 herein can perform both the display driving and the touch driving in all frame time intervals (that is, all active time intervals).

Alternatively, the touch display device 100 herein can perform the display driving in one or more frame time intervals (active time intervals), and perform the display driving and the touch driving simultaneously or together in other one or more frame time intervals (active time intervals) except for the one or more frame time intervals for the display driving. In some embodiments, the touch display device 100 can perform only the touch driving in one or more any frame time intervals (active time intervals).

For one example, when supplying a touch driving signal TDS with a variable voltage level to one or more touch electrodes TE for an active time interval, the touch display device 100 herein can supply the touch driving signal TDS with a variable voltage level to one or more touch electrodes TE in a blank time interval (Case 1).

As another example, the touch display device 100 herein can float one or more touch electrodes TE, supply an DC voltage, or supply a specific reference voltage (e.g., a ground voltage), for a blank time interval (Case 2). This case may be applied to an application in which the blank time interval is utilized for pen touch driving.

Figure 8:
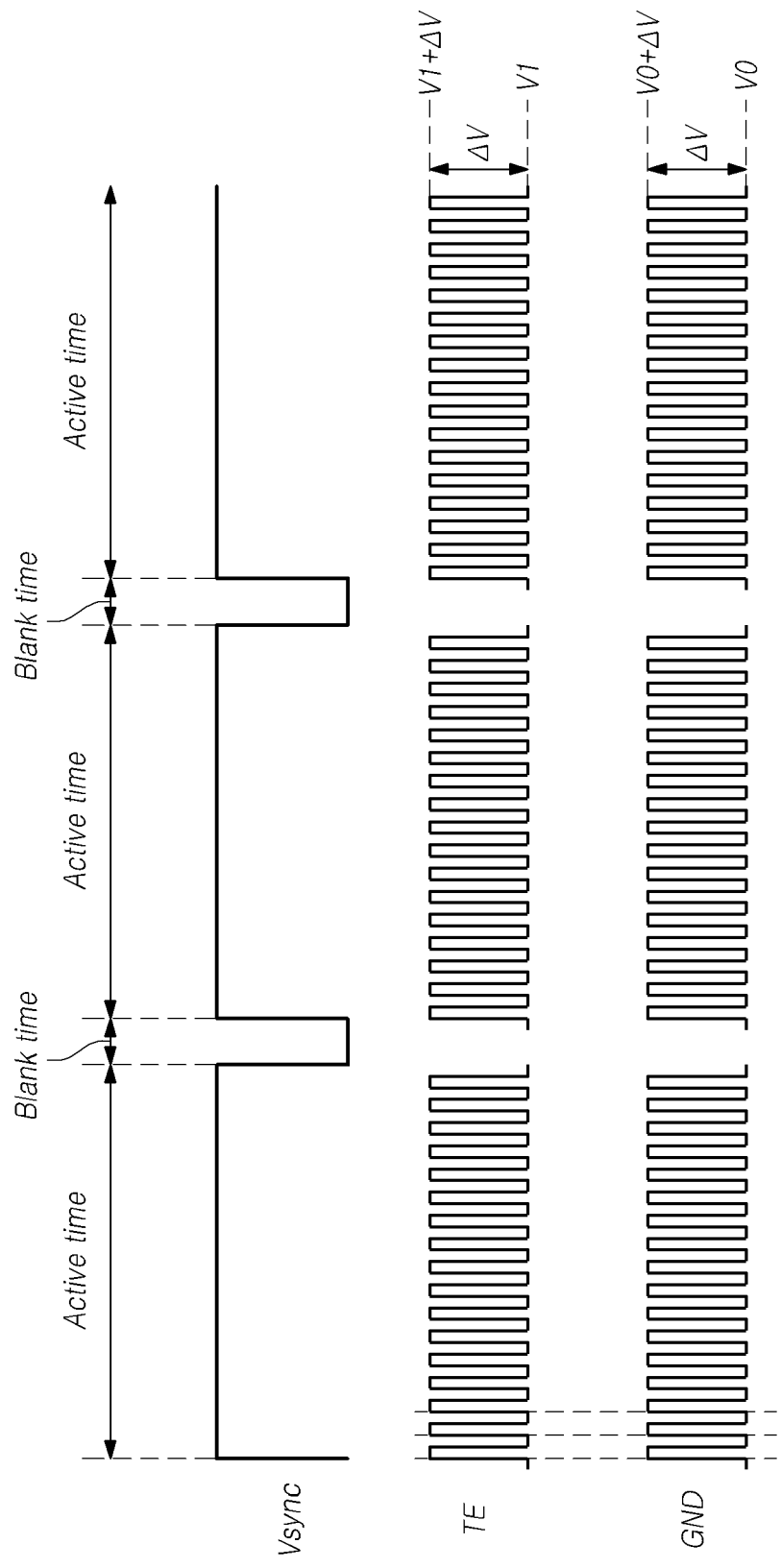
FIG. 8 is a diagram illustrating a time free driving scheme using a ground modulation scheme in the touch display device according to embodiments of the present disclosure.

FIG. 8 is a diagram illustrating a time free driving scheme using a ground modulation scheme in the touch display device 100 according to embodiments of the present disclosure.

Referring to FIG. 8, in the touch display device 100 herein, while the display driving is performed (that is, for an active time interval), when a touch driving signal TDS with a variable voltage level is supplied to a touch electrode TE, a ground voltage of a ground GND to which the display panel DISP is grounded can correspond in at least one of a frequency, a phase, a voltage polarity, an amplitude, or the like to the touch driving signal TDS. In one embodiment, the ground voltage of a ground GND and the touch driving signal TDS have the same frequency, phase, voltage polarity, and/or amplitude.

Referring to FIG. 8, while the display driving and the touch driving is performed simultaneously or together (that is, for an active time interval), a ground voltage of the ground GND to which the display panel DISP is grounded can have an amplitude of ΔV and be varied between V0 and V0+ΔV. The touch driving signal TDS applied to the touch electrode TE can have an amplitude of ΔV and be varied between V1 and V1+ΔV.

According to example of FIG. 8, the ground voltage of the ground GND to which the display panel DISP and the touch driving signal TDS applied to the touch electrode TE may be identical in a frequency, a phase, and an amplitude to each other. In this case, when the voltages have variable levels, high level voltages and low level voltages may be identical to each other (V0=V1), or be different from each other (V0≠V1).

FIGS. 9 to 12 are diagrams illustrating a ground modulation scheme and a ground modulation circuit GMC of the touch display device 100 according to embodiments of the present disclosure. FIG. 13 illustrates the ground modulation circuit GMC of the touch display device 100 according to embodiments of the present disclosure.

Figure 9:
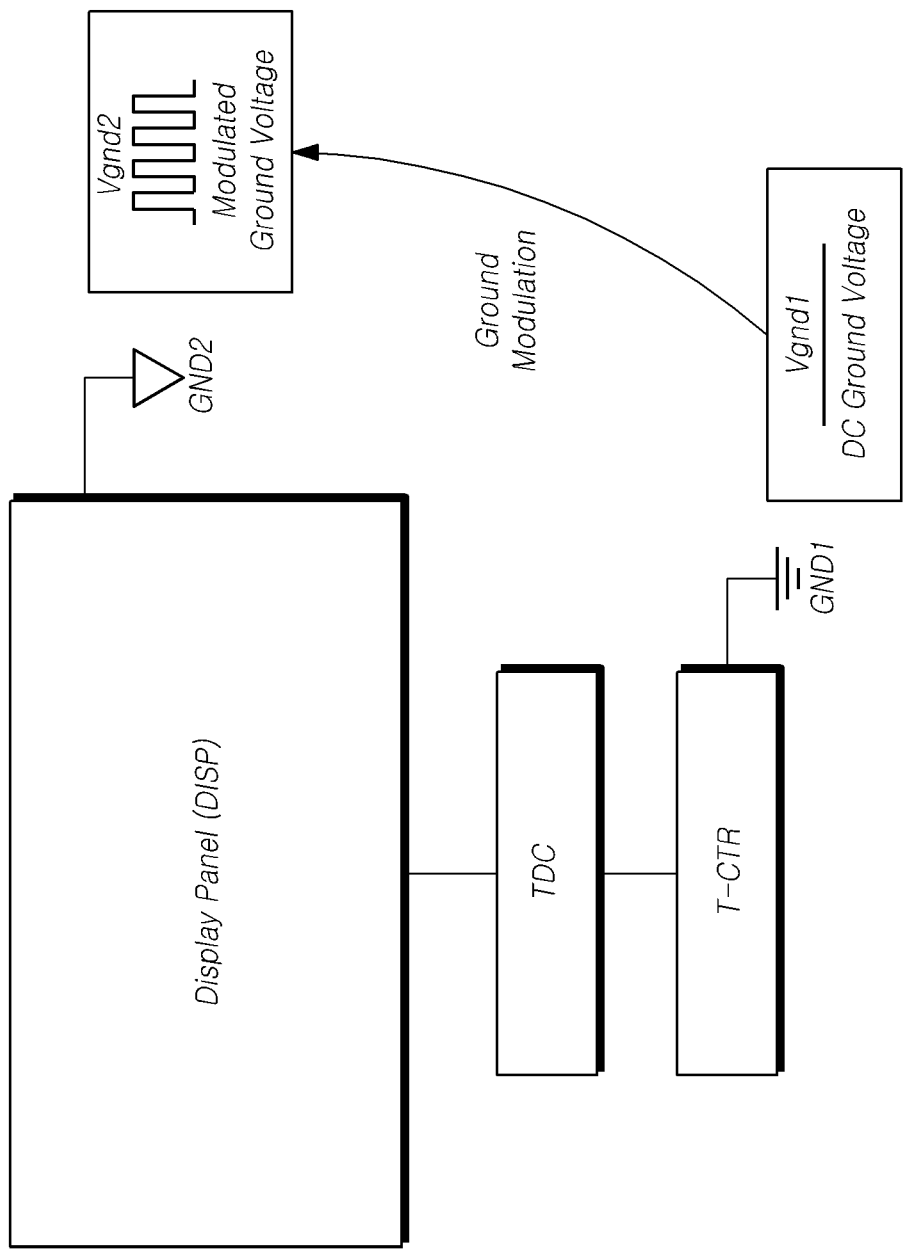
FIGS. 9 to 12 are diagrams illustrating the ground modulation scheme and a ground modulation circuit of the touch display device according to embodiments of the present disclosure.

Referring to FIG. 9, the touch display device 100 according to embodiments of the present disclosure can include a display panel DISP including a plurality of data lines DL, a plurality of gate lines GL, a plurality of touch electrodes TE, and a plurality of touch lines TL electrically connected to the plurality of touch electrodes TE, each of which corresponds to each of the plurality of touch lines TL, a touch driving circuit TDC for driving one or more of the plurality of touch electrodes TE, and a touch controller T-CTR for detecting the presence or absence or the location of a touch by at least one of a finger and a pen based on touch sensing data received from the touch driving circuit TDC.

Referring to FIG. 9, the touch controller T-CTR can be grounded to a first ground GND1. The display panel DISP can be grounded to a second ground GND2 other than the first ground GND1.

For example, the first ground GND1 may be a ground line or a ground electrode disposed in the display panel DISP, or be a configuration or a part located outside of the display panel DISP such as, an outside cover of the display panel DISP, or be a line or an electrode disposed in the outside configuration or part. Further, the second ground GND2 may be a ground line or a ground electrode disposed in the display panel DISP, or be a configuration or a part located outside of the display panel DISP such as, an outside cover of the display panel DISP, or be a line or an electrode disposed in the outside configuration or part.

Figure 10:
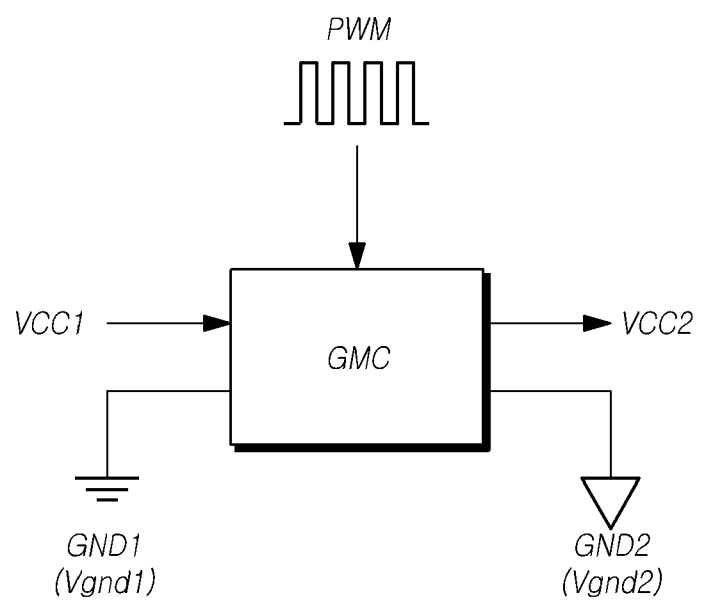

Referring to FIGS. 9 and 10, the touch display device 100 according to embodiments of the present disclosure can further include a ground modulation circuit GMC applying a modulation signal PWM to a first ground GND1 or a second ground GND2 so that one of a first ground voltage Vgnd1 of the first ground GND1 and a second ground voltage Vgnd2 of the second ground GND2 can be modulated or further modulated in comparison with the other.

Referring to FIG. 9, the second ground voltage Vgnd2 of the second ground GND2 can be regarded as being modulated or further modulated in comparison with the first ground voltage Vgnd1 of the first ground GND1. Referring to FIG. 9, the first ground voltage Vgnd1 of the first ground GND1 can be regarded as being modulated or further modulated in comparison with the second ground voltage Vgnd2 of the second ground GND2.

That is, the second ground voltage Vgnd2 can be regarded as a modulated signal with a variable voltage level (a modulated ground voltage) when observing the waveform of the second ground voltage Vgnd2 relative to that of the first ground voltage Vgnd1. That is, the first ground voltage Vgnd1 can be regarded as a modulated signal with a variable voltage level (a modulated ground voltage) when observing the waveform of the first ground voltage Vgnd1 relative to that of the second ground voltage Vgnd2.

By grounding the display panel DISP to the second ground GND2 with the second ground voltage Vgnd2 in the form of a modulated signal, it is possible to enable touch driving signals TDS applied to touch electrodes TE in the display panel DISP to swing like the second ground voltage Vgnd2.

As described above, touch display device 100 can stably perform, using two grounds GND1 and GND2, display driving and touch driving simultaneously or together in the time free driving scheme.

Since the touch display device 100 performs the display driving and the touch driving simultaneously or together in the time free driving scheme, one or more data voltages can be applied to a plurality of data lines DL while one or more touch driving signals TDS are applied to a plurality of touch electrodes TE.

In this case, the touch driving signals TDS applied to one or more of the plurality of touch electrodes TE can correspond in at least one of signal characteristics, such as, a frequency, a phase, a voltage polarity, an amplitude, or the like to the second ground voltage Vgnd2 of the second ground GND2 to which the display panel DISP is grounded. In one embodiment, the touch driving signals TDS and the second ground voltage Vgnd2 have the same frequency, phase, voltage polarity, and/or amplitude.

Meanwhile, when the plurality of touch electrodes TE are divided common electrodes to which one or more common voltages Vcom are applied and which are used for display driving, one or more touch driving signals TDS applied to one or more of the plurality of touch electrodes TE may be a common voltage Vcom for display driving.

Figure 11:
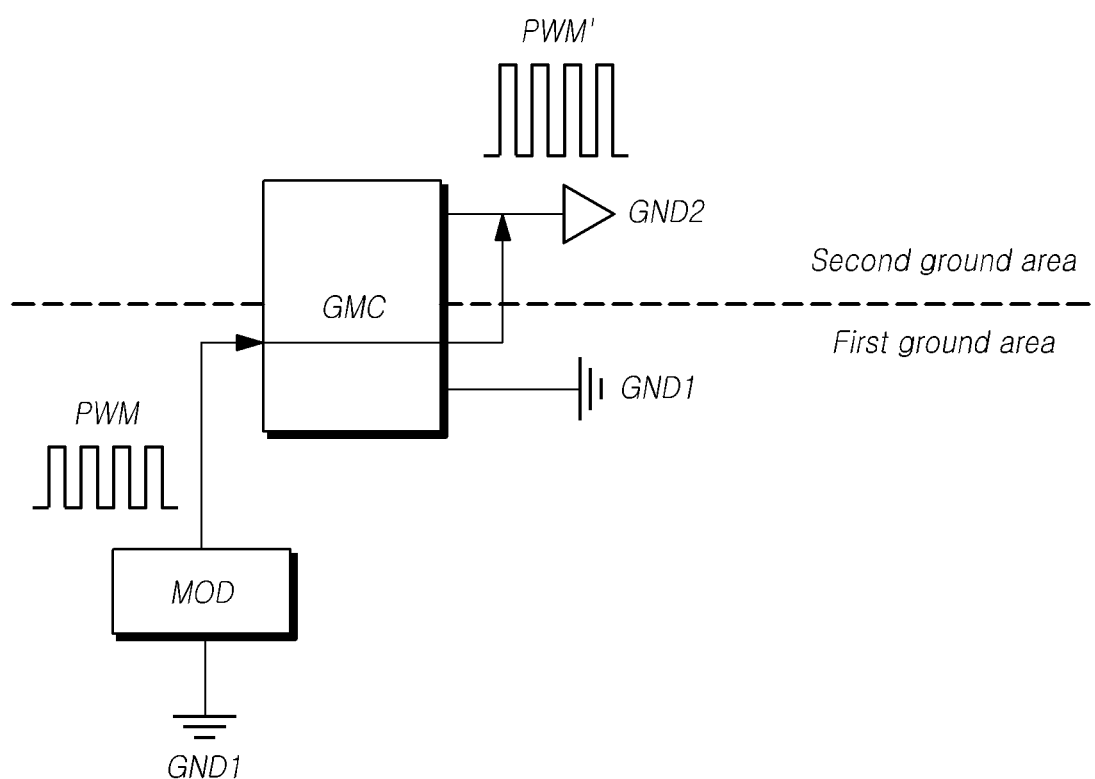
Figure 12:
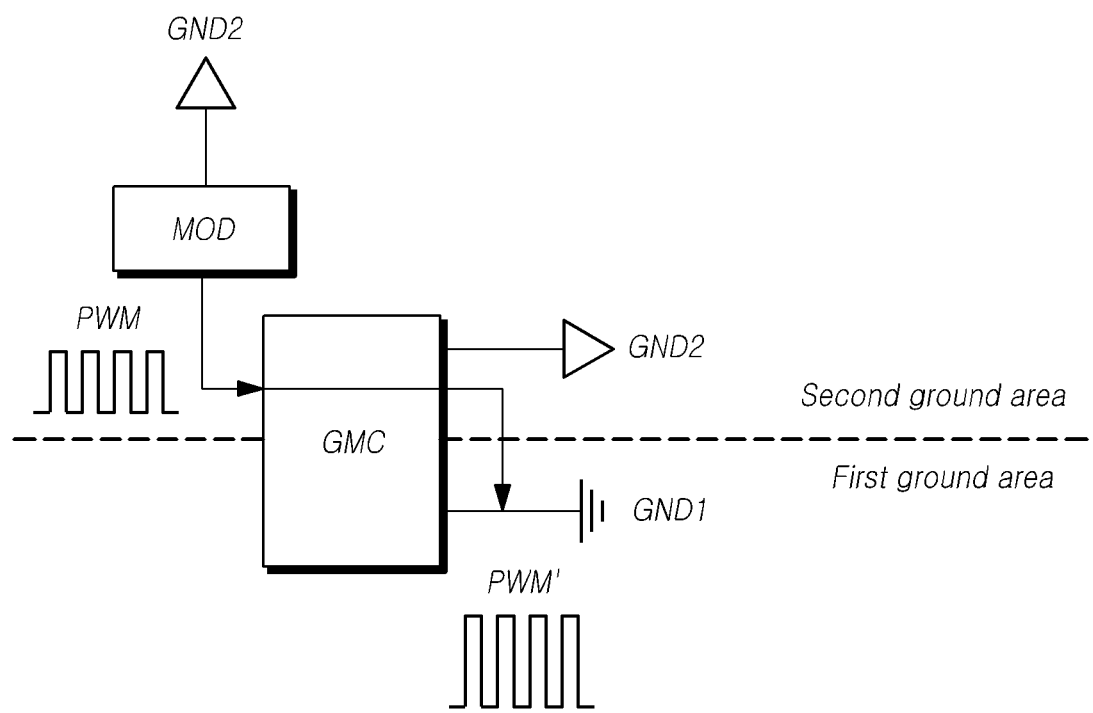
Figure 13:
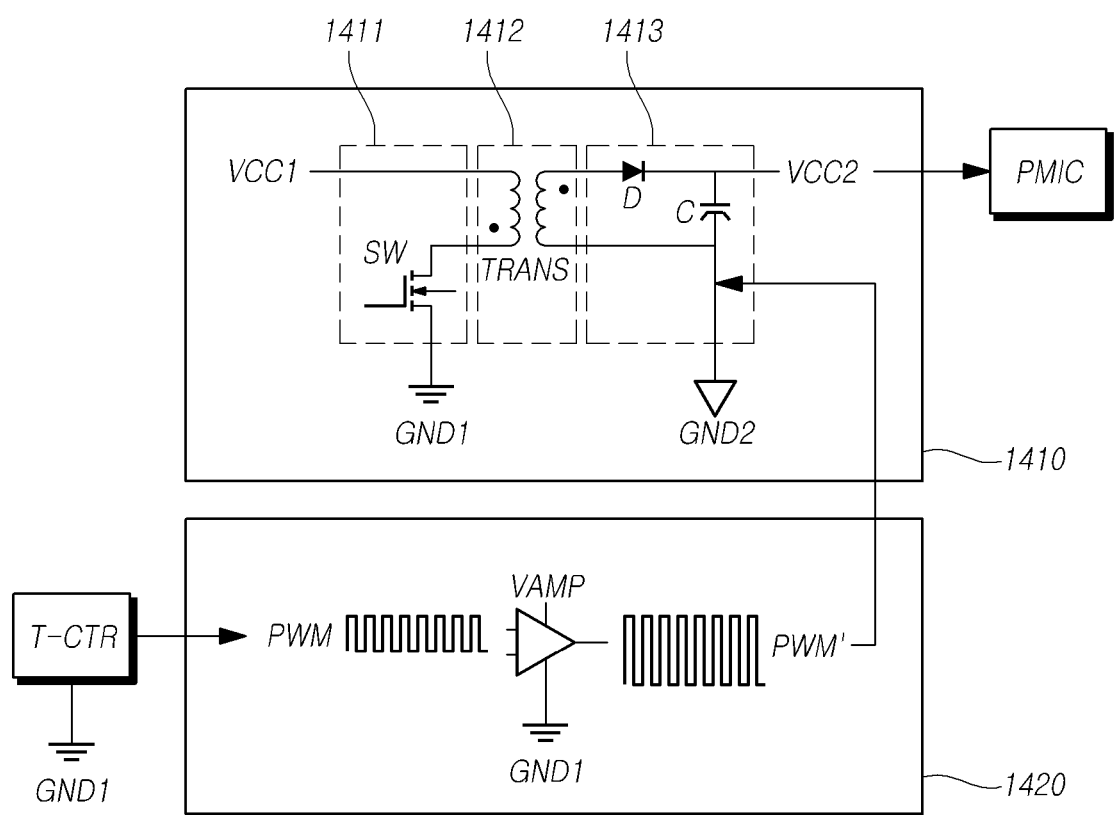
FIG. 13 is a diagram illustrating the ground modulation circuit of the touch display device according to embodiments of the present disclosure.

Referring to FIGS. 11 and 12, the touch display device 100 can further include a modulator MOD for outputting a reference modulation signal PWM for modulating a ground signal.

The ground modulation circuit GMC can apply a reference modulation signal (e.g., PWM) outputted from the modulator MOD or a modulation signal (e.g., PWM') obtained by amplifying the reference modulation signal (e.g., PWM) to the first ground GND1 or the second ground GND2.

Referring to FIG. 11, when the modulator MOD is grounded to the first ground GND1, the ground modulation circuit GMC can apply a reference modulation signal (e.g., PWM) outputted from the modulator MOD or a modulation signal (e.g., PWM') obtained by amplifying the reference modulation signal (e.g., PWM) to the second ground GND2.

In this case, the modulator MOD may be the touch controller T-CTR grounded to the first ground GND1.

Referring to FIG. 12, when the modulator MOD is grounded to the second ground GND2, the ground modulation circuit GMC can apply a reference modulation signal (e.g., PWM) outputted from the modulator MOD or a modulation signal (e.g., PWM') obtained by amplifying the reference modulation signal (e.g., PWM) to the first ground GND1.

Thus, the touch display device 100 can efficiently perform ground modulation according to an environment of operations or configurations.

Referring to FIG. 13, the ground modulation circuit GMC of the touch display device 100 herein can include a power supply separation circuit 1410, a voltage modulation circuit 1420, and the like.

The ground modulation circuit GMC can be connected to both the first ground GND1 and the second ground GND2.

The power supply separation circuit 1410 is a circuit for separating the first ground GND1 and the second ground GND2 from each other, can transfer a power supply voltage VCC1 of the first ground GND1 to the second ground GND2.

For enabling one (e.g., Vgnd1 or Vgnd2) of a first ground voltage Vgnd1 of the first ground GND1 and a second ground voltage Vgnd2 of the second ground GND2 to be modulated or further modulated in comparison with the other (e.g., Vgnd2 or Vgnd1), the voltage modulation circuit 1420 can apply, to the first ground GND1 or the second ground GND2, a modulation signal (e.g., PWM) or a modulation signal (e.g., PWM') obtained by amplifying the modulation signal (e.g., PWM).

Such a voltage modulation circuit 1420 can include an amplifier VAMP receiving a modulation signal (e.g., PWM) from the modulator MOD as in FIGS. 11 and 12, amplifying the received modulation signal, and outputting an amplified modulation signal (e.g., PWM'), and the like. The amplifier VAMP may be implemented as a level shifter, and/or the like.

The amplified modulation signal (e.g., PWM') outputted from the amplifier VAMP can be applied to the first ground GND1 or the second ground GND2.

As described above, since the ground modulation circuit GMC includes the power supply separation circuit 1410 for electrically separating the first ground GND1 and the second ground GND2, even when two types of grounds GND1 and GND2 are configured within the touch display device 100, it is possible for the touch display device 100 to perform driving operations stably and normally without an abnormal operation caused by the configuration of the two grounds GND1 and GND2.

For example, the power supply separation circuit 1410 can include at least one of a transformer, a coupled inductor, or a converter, or the like.

For example, the converter can include at least one of a fly-back converter, a fly-buck converter, a buck-boost converter, or the like.

FIG. 13 shows that the power supply separation circuit 1410 is implemented as the fly-back converter.

Referring to FIG. 13, the power supply separation circuit 1410 can include an input portion 1411 connected to the first ground GND1 and receiving a first side power supply voltage (e.g., VCC1), a transfer portion 1412 maintaining or converting a value of a power supply voltage (e.g., VCC1), and an output portion 1413 connected to the second ground GND2 and outputting a second side power supply voltage (e.g., VCC2) outputted from the transfer portion 1412.

The transfer portion 1412 includes a transformer TRANS having a first winding and a second winding at a predetermined winding ratio.

The input portion 1411 is connected to the first winding of the transformer TRANS.

The input portion 1411 can input the power supply voltage (e.g., VCC1) to one end of the first winding of the transformer TRANS, and connect the first ground GND1 to the other end of the first winding of the transformer TRANS.

The input portion 1411 can include a switch SW that controls a connection between the other end of the first winding of the transformer TRANS and the first ground GND1.

The output portion 1413 is connected to the second winding of the transformer TRANS.

The output portion 1413 can include a diode D connected between one end of the second winding of the transformer TRANS and an output point of a second side power supply voltage VCC2, a capacitor C connected between the output point of the second side power supply voltage VCC2 and the other end of the second winding of the transformer TRANS, and the like.

In the output portion 1413, the other end of the second winding of the transformer TRANS or a point connected to the other end of the second winding of the transformer TRANS is connected to the second ground GND2.

In the power supply separation circuit 1410, the input portion 1411 and the output portion 1413 are insulated from each other by the transfer portion 1412.

The modulation signal (e.g., PWM') outputted from the voltage modulation circuit 1420 may be applied to the first ground GND1 connected to the input portion 1411 or the second ground GND2 connected to the output portion 1413.

As in FIG. 11, in FIG. 13, the touch controller T-CTR corresponding to the modulator MOD is grounded to the first ground GND1; therefore, the modulation signal (e.g., PWM') outputted from the voltage modulation circuit 1420 may be applied to the second ground GND2 connected to the output portion 1413.

Figure 14:
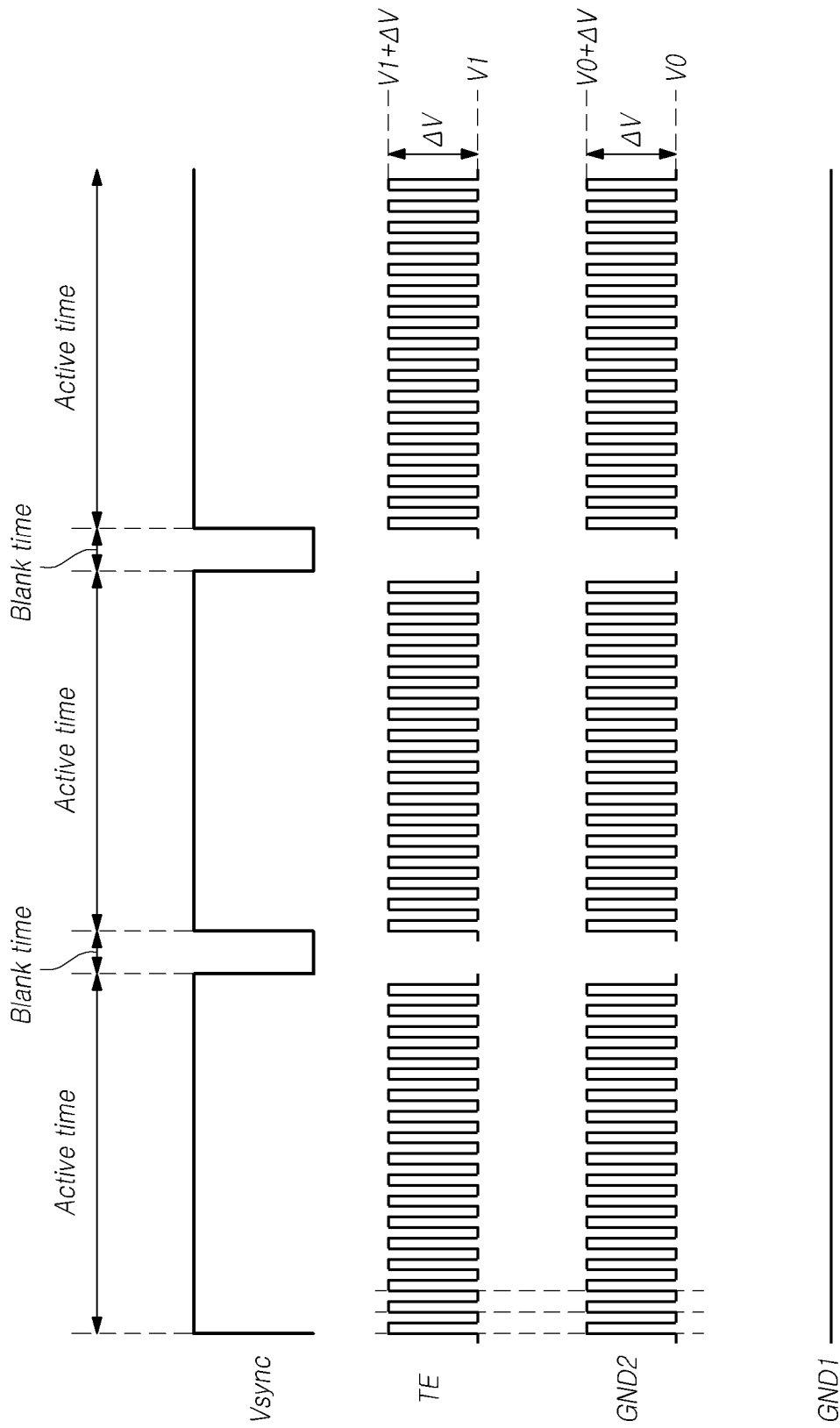
FIG. 14 is a diagram illustrating a touch driving signal, a first ground voltage and a second ground voltage relative to a first ground in the touch display device according to embodiments of the present disclosure.

FIG. 14 is a diagram illustrating a touch driving signal TDS, a first ground voltage Vgnd1 and a second ground voltage Vgnd2 relative to the first ground GND1 in the touch display device 100 according to embodiments of the present disclosure.

Referring to FIG. 14, when observing relative to the first ground GND1, the first ground voltage Vgnd1 is a DC ground voltage, the touch driving signal TDS and the second ground voltage Vgnd2 may be regarded as a signal with a changed voltage level (modulation signal) in comparison with the first ground voltage Vgnd1.

That is, the second ground voltage Vgnd2 and the touch driving signal TDS applied to a touch electrode TE may be modulated signals relative to the first ground voltage Vgnd1. In this case, the second ground voltage Vgnd2 and the touch driving signal TDS may correspond identically or similarly to each other in at least one of signal characteristics, such as, a frequency, a phase, a voltage polarity, an amplitude, or the like.

In addition, the second ground voltage Vgnd2 and a data voltage applied to a data line DL may be modulated signals relative to the first ground voltage Vgnd1. In this case, the second ground voltage Vgnd2 and the data voltage may correspond identically or similarly to each other in at least one of signal characteristics, such as, a frequency, a phase, a voltage polarity, an amplitude, or the like.

Meanwhile, when observing relative to the second ground GND2, the first ground voltage Vgnd1 may be regarded as a signal with a changed voltage level (modulation signal). In this case, the second ground voltage Vgnd2 and the touch driving signal TDS may be regarded as DC ground voltages.

Accordingly, since the data voltage and the touch driving signal TDS applied to the data line DL and the touch electrode TE in the display panel DISP correspond to the second ground voltage Vgnd2 of the second ground GND2 to which the display panel DISP is grounded, it is possible to perform the display driving and the touch driving simultaneously or together.

Figure 15:
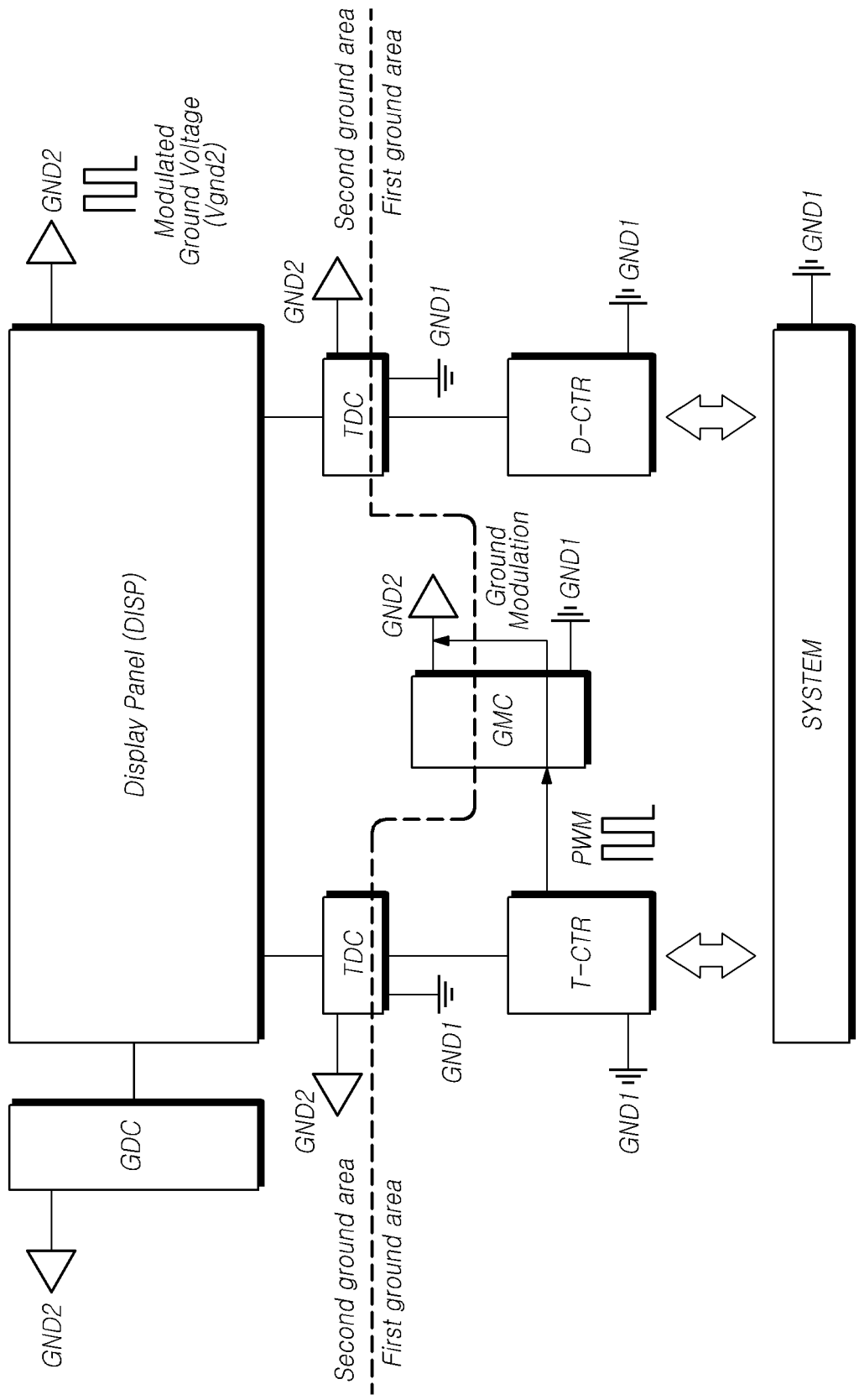
FIG. 15 is a diagram illustrating grounding states for each main component in the touch display device according to embodiments of the present disclosure.

FIG. 15 is a diagram illustrating grounding states for each main component in the touch display device 100 according to embodiments of the present disclosure.

Referring to FIG. 15, the display controller D-CTR for controlling the data driving circuit DDC and the gate driving circuit GDC can be a component grounded to the first ground GND1.

Accordingly, the display controller D-CTR can perform control operations stably.

Meanwhile, the data driving circuit DDC for driving the plurality of data lines DL and the gate driving circuit GDC for driving the plurality of gate lines GL can be grounded to the second ground GND2, or grounded to the first ground GND1 as well.

Further, as described above, the touch controller T-CTR can be grounded to the first ground GND1. The ground modulation circuit GMC can be grounded to both the first ground GND1 and the second ground GND2.

The display controller D-CTR and the touch controller T-CTR can communicate with the system of the touch display device 100. The system can further include a main board, a power device, and various electronic devices.

This system can be grounded to a first ground GND1 which may be a system ground.

Thus, by enabling main components included in the touch display device 100 to be grounded to the first ground GND1 or to the second ground GND2 different from the first ground GND1, the main components can perform control operations stably, and the display driving and the touch driving can be performed simultaneously or together.

Meanwhile, since the touch display device 100 herein performs the display driving and the touch driving simultaneously or together, there is a possibility that power consumption can increase. Accordingly, in accordance with embodiments of the present disclosure, by separating power sources for the display driving and the touch driving from each other and independently controlling respective power sources according a driving mode, it is possible to reduce power consumption.

Figure 16:
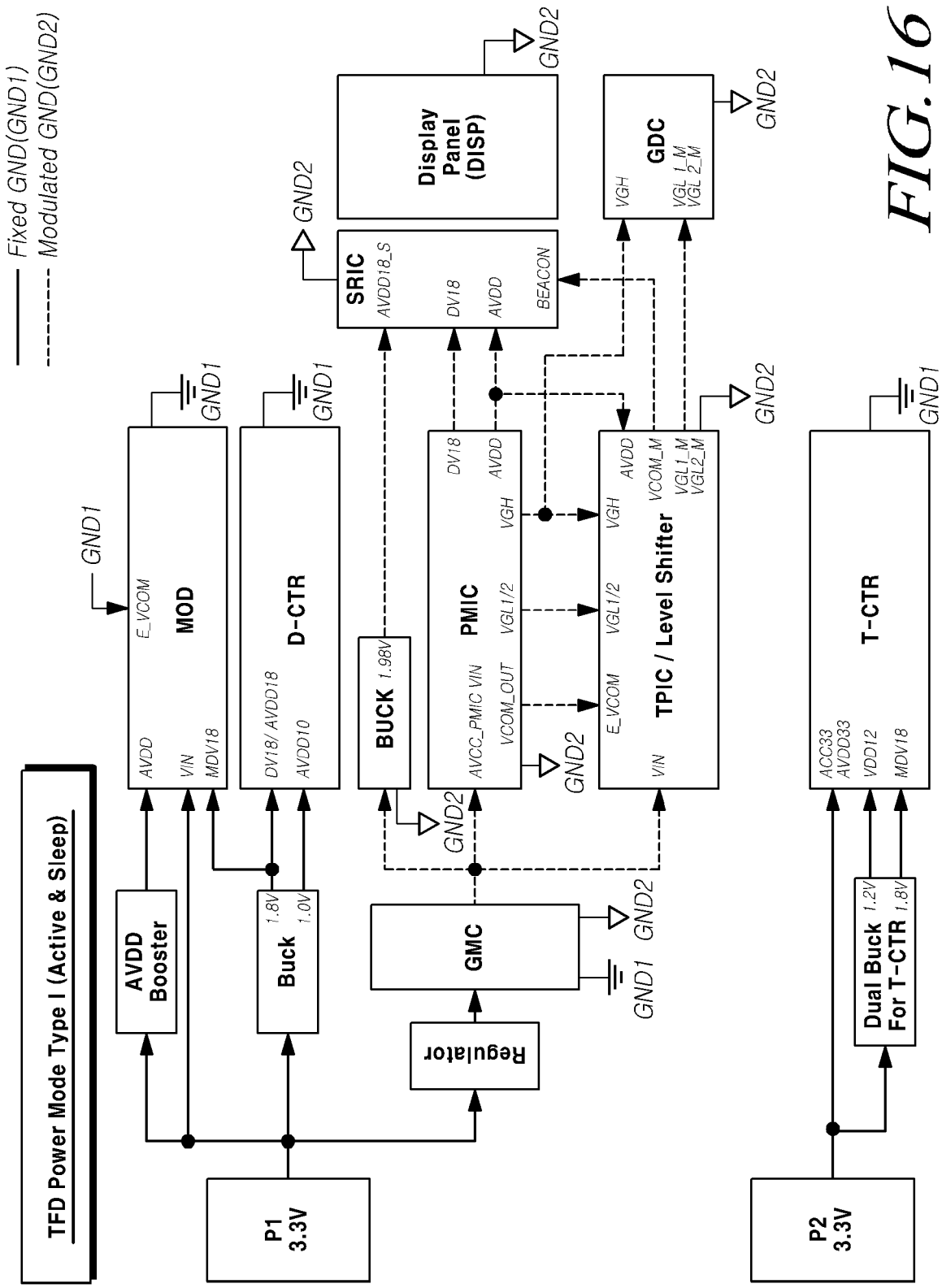
FIG. 16 is a diagram illustrating an example of each main component and the configuration of power sources for driving the main components in the touch display device according to embodiments of the present disclosure.

FIG. 16 illustrates each main component and the configuration of power sources for driving the main components in the touch display device 100 according to embodiments of the present disclosure, and illustrates that the touch display device 100 can be operated in an active mode and a sleep mode.

Herein, the active mode is referred to as "first driving mode", and the sleep mode is referred to as "second driving mode".

Referring to FIG. 16, the touch display device 100 herein can include a first power source P1 for driving the display controller D-CTR and the like, and a second power source P2 for driving the touch controller T-CTR and the like.

The first power source P1 and the second power source P2 can be controlled by the system, and be turned on or off independently from each other.

Specifically, the first power source P1 can supply, to the display controller D-CTR, several types of power sources (DV18/AVDD18, AVDD10, etc.) used for the driving of the display controller D-CTR. Further, the first power source P1 can supply several types of power sources (AVDD, MDV18, etc.) used for the driving of the modulator MOD to the modulator MOD outputting a modulation signal for modulating a ground voltage. At least one or more of several types of power sources can be supplied through an AVDD booster or a buck converter.

Further, the first power source P1 can supply power to the ground modulation circuit GMC performing ground modulation by applying a modulation supply to the first ground GND1 or the second ground GND2.

Further, the ground modulation circuit GMC is driven by the first power source P1, and can supply several types of voltages for driving a power management integrated circuit PMIC, a touch power integrated circuit TPIC, an integrating integrated circuit SRIC, or the like.

Here, an arrow between the first power source P1 and several types of driving circuits indicates a direction in which power is supplied, a solid line indicates a power source supplied to a circuitry grounded to the first ground GND1, and a dotted line indicates a power source supplied to a circuitry grounded to the secondary ground GND2.

That is, the power management integrated circuit PMIC, the touch power integrated circuit TPIC, the integrating integrated circuit SRIC, the gate driving circuit GDC to which power from the power management integrated circuit PMIC and the touch power integrated circuit TPIC is supplied, and the like can operate based on the second ground voltage Vgnd2 of the second ground GND2 modulated by the ground modulation circuit GMC.

Further, the second power source P2 can supply, to the touch controller T-CTR, several types of power sources (ACC33, AVDD33, VDD12, MDV18 etc.) used for the driving of the touch controller T-CTR. At least one or more of several types of power sources can be supplied to the touch controller T-CTR through a dual buck converter.

Thus, the touch display device 100 herein can perform the display driving and the touch driving based on ground modulation by power supplied from the first power source P1 and the second power source P2.

Further, the touch display device 100 herein can be driven by the first power source P1 and the second power source P2 separated from each other; therefore, power consumption of the touch display device 100 can be reduced according to driving modes.

Figure 17:
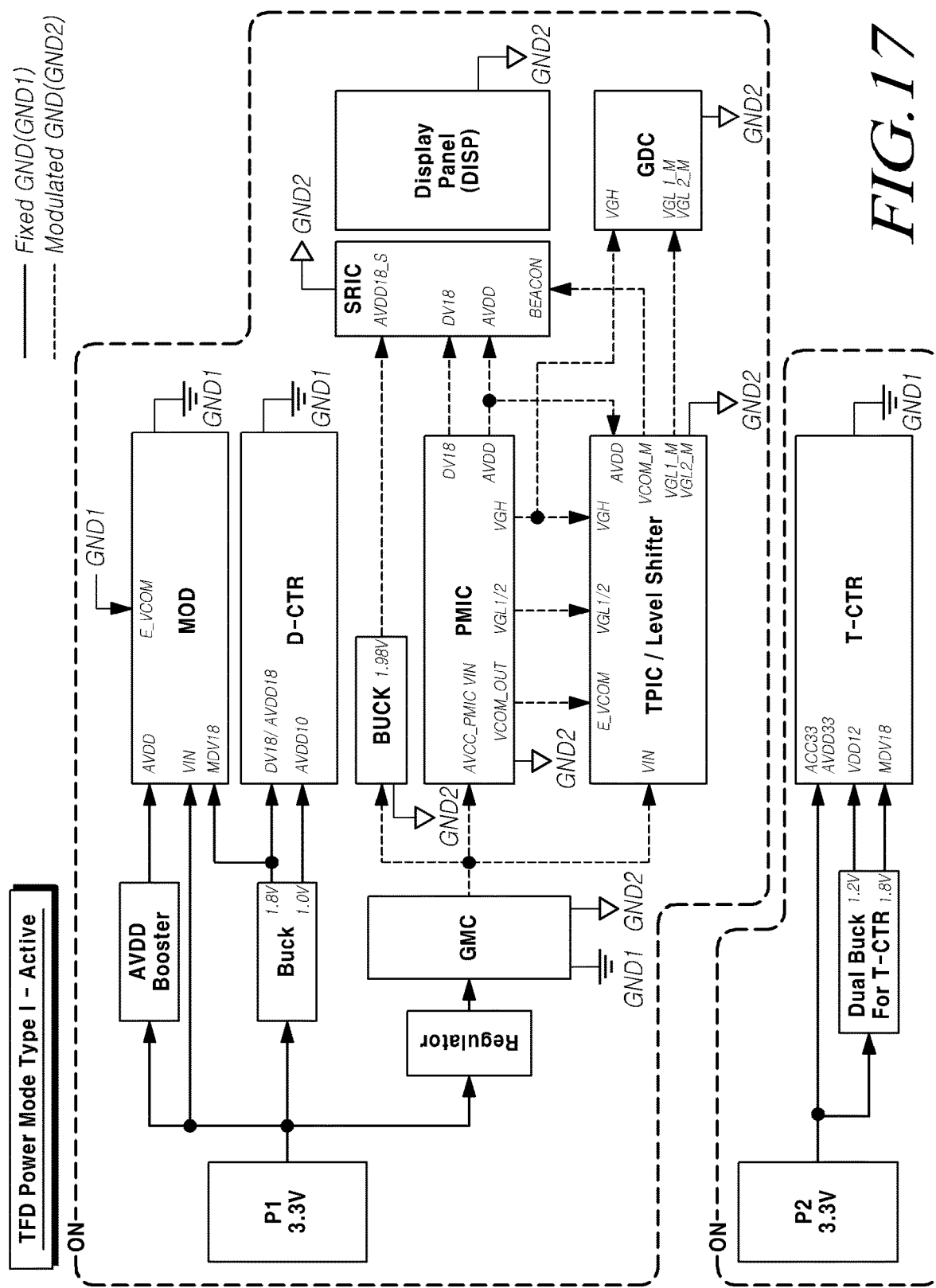
FIGS. 17 and 18 are diagrams illustrating example operating schemes according to driving modes in the touch display device shown in FIG. 16.
Figure 18:
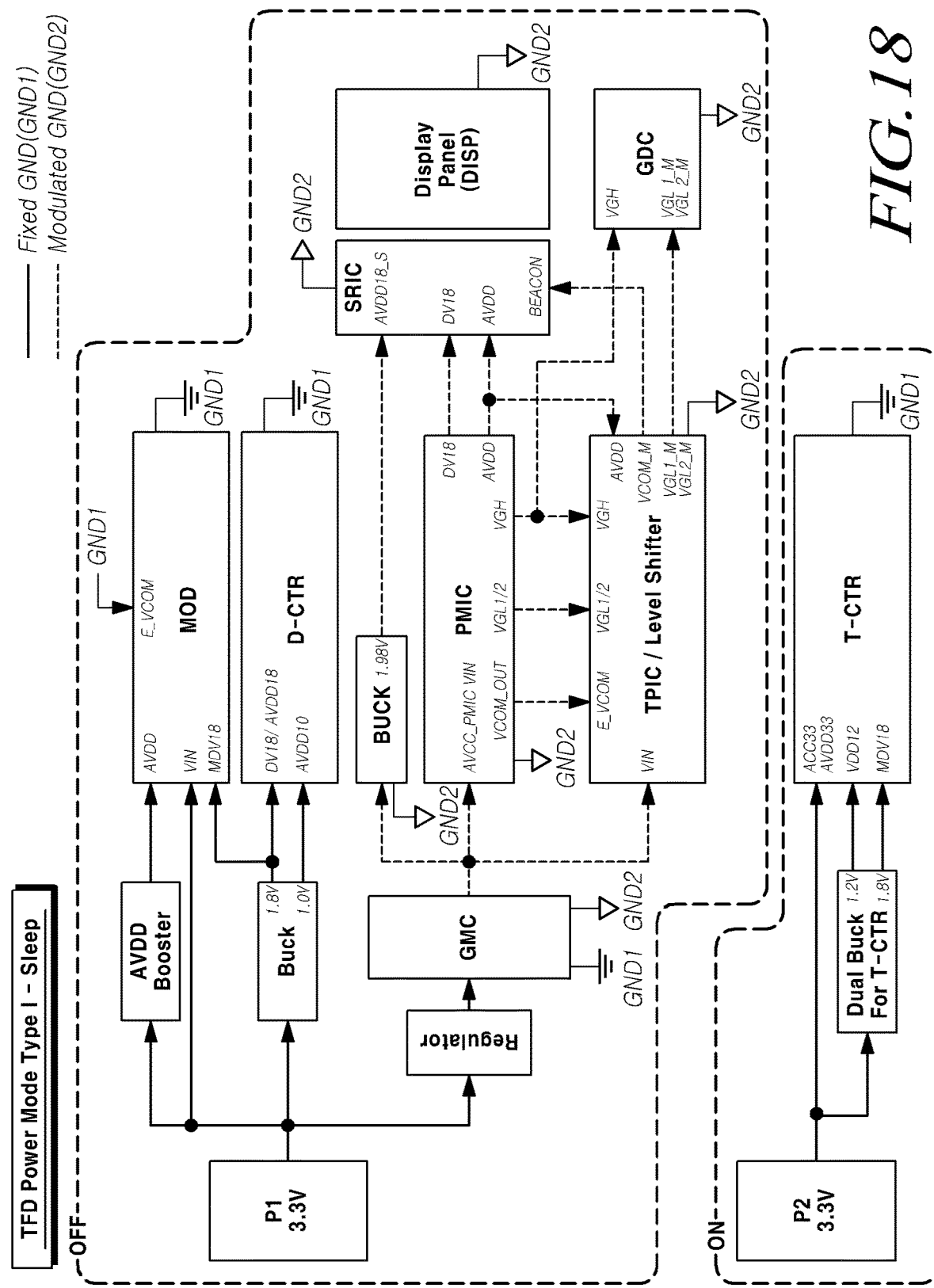

FIGS. 17 and 18 illustrate operating schemes according to driving modes in the touch display device 100 shown in FIG. 16. FIG. 17 illustrates an operating scheme according to the active mode, and FIG. 18 illustrates an operating scheme according to the sleep mode.

Referring to FIG. 17, in the active mode of the touch display device 100 herein, the first power source P1 and the second power source P2 becomes an on-state by the controlling of the system.

Accordingly, the display controller D-CTR, the modulator MOD, the ground modulation circuit GMC and the like can be driven by power supplied from the first power source P1.

Further, the power management integrated circuit PMIC, the touch power integrated circuit TPIC, the integrating integrated circuit SRIC, the gate driving circuit GDC, and the like can be driven based on voltages supplied from the ground modulation circuit GMC.

In addition, the touch controller T-CTR can be driven by power supplied from the second power source P2.

Thus, in the active mode, the touch display device 100 can perform the display driving and the touch driving by power supplied from the first power source P1 and the second power source P2.

Further, in the sleep mode, it is possible to reduce power consumption by turning off at least one of power sources.

Referring to FIG. 18, in the sleep mode of the touch display device 100 herein, the first power source P1 becomes an off-state by the controlling of the system and the second power source P2 remains an on-state.

Accordingly, in the sleep mode, the driving of the display controller D-CTR, the modulator MOD, the ground modulation circuit GMC and the like, to which power from the first power source P1 is supplied, can be stopped.

In addition, only the touch controller T-CTR to which power from the second power source P2 is supplied can be driven.

Thus, as the first power source P1 becomes the off-state in the sleep mode, it is possible for the touch display device 100 to minimize power consumption and to reduce standby power consumption.

Meanwhile, as described above, the touch display device 100 driven in the active mode and the sleep mode can reduce standby power consumption through the sleep mode; since touch sensing is not performed, the touch display device 100 can be transitioned into the active mode by a control signal of the system, not an external input.

In accordance with embodiments of the present disclosure, by enabling the touch sensing to be performed in even a condition of reducing power consumption of the display device 100, it is possible to provide transition into the active mode by touch sensing.

Figure 19:
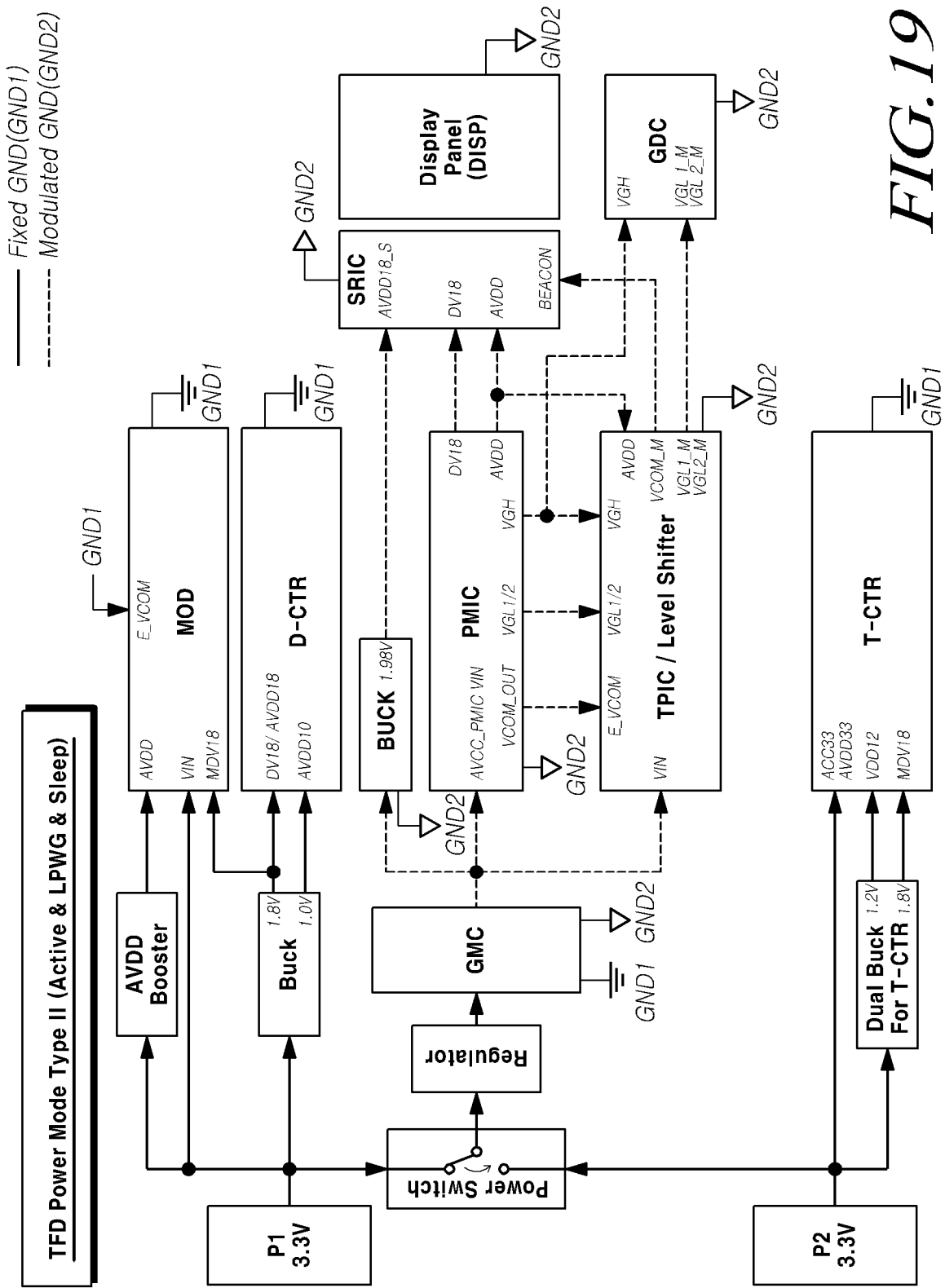
FIG. 19 is a diagram illustrating another example of each main component and the configuration of power sources for driving the main components in the touch display device according to embodiments of the present disclosure.

FIG. 19 illustrates another example of each main component and the configuration of power sources for driving the main components in the touch display device 100 according to embodiments of the present disclosure, and illustrates that the touch display device 100 can be operated in the active mode and a low power wake-up gesture mode LPWG. Further, in such a structure, a method for driving the touch display device 100 in the sleep mode will be described.

Herein, the active mode is referred to as "first driving mode", and the low power wake-up gesture mode LPWG is referred to as "second driving mode". The sleep mode is referred to as "third driving mode".

Referring to FIG. 19, the touch display device 100 herein can include a first power source P1 for driving the display controller D-CTR and the like, and a second power source P2 for driving the touch controller T-CTR and the like.

Further, the touch display device 100 can further include a power switch for controlling the ground modulation circuit GMC and the first power source P1 to be connected, or controlling the ground modulation circuit GMC and the second power source P2 to be connected.

The first power source P1 and the second power source P2 can be controlled by the system, and be turned on or off independently from each other.

The first power source P1 supplies several types of power sources used for driving the display controller D-CTR and the modulator MOD.

The second power source P2 supplies several types of power sources used for driving the touch controller T-CTR.

Here, the ground modulation circuit GMC can receive power from the first power source P1 or receive power from the second power source P2 by the controlling of the power switch.

The ground modulation circuit GMC can be driven by power supplied from the first power source P1 or the second power source P2. Further, the power management integrated circuit PMIC, the touch power integrated circuit TPIC, the integrating integrated circuit SRIC, the gate driving circuit GDC, and the like can be driven based on voltages supplied from the ground modulation circuit GMC.

Here, as the ground modulation circuit GMC is driven by the first power source P1 or the second power source P2, the touch sensing can be performed in even a condition of reduced power consumption through the controlling of the power switch.

Figure 20:
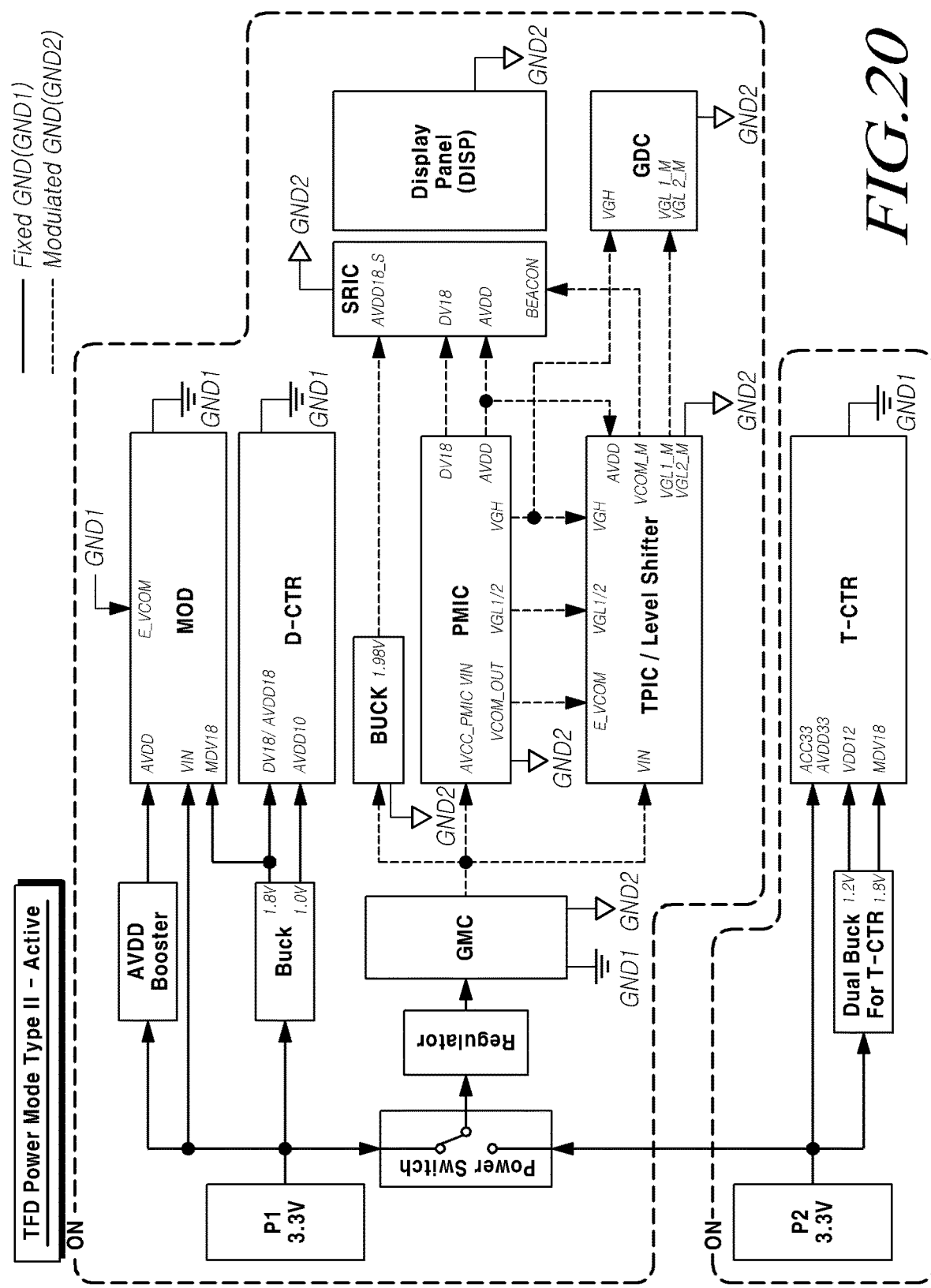
FIGS. 20 to 22 are diagrams illustrating example operating schemes according to driving modes in the touch display device shown in FIG. 19.
Figure 21:
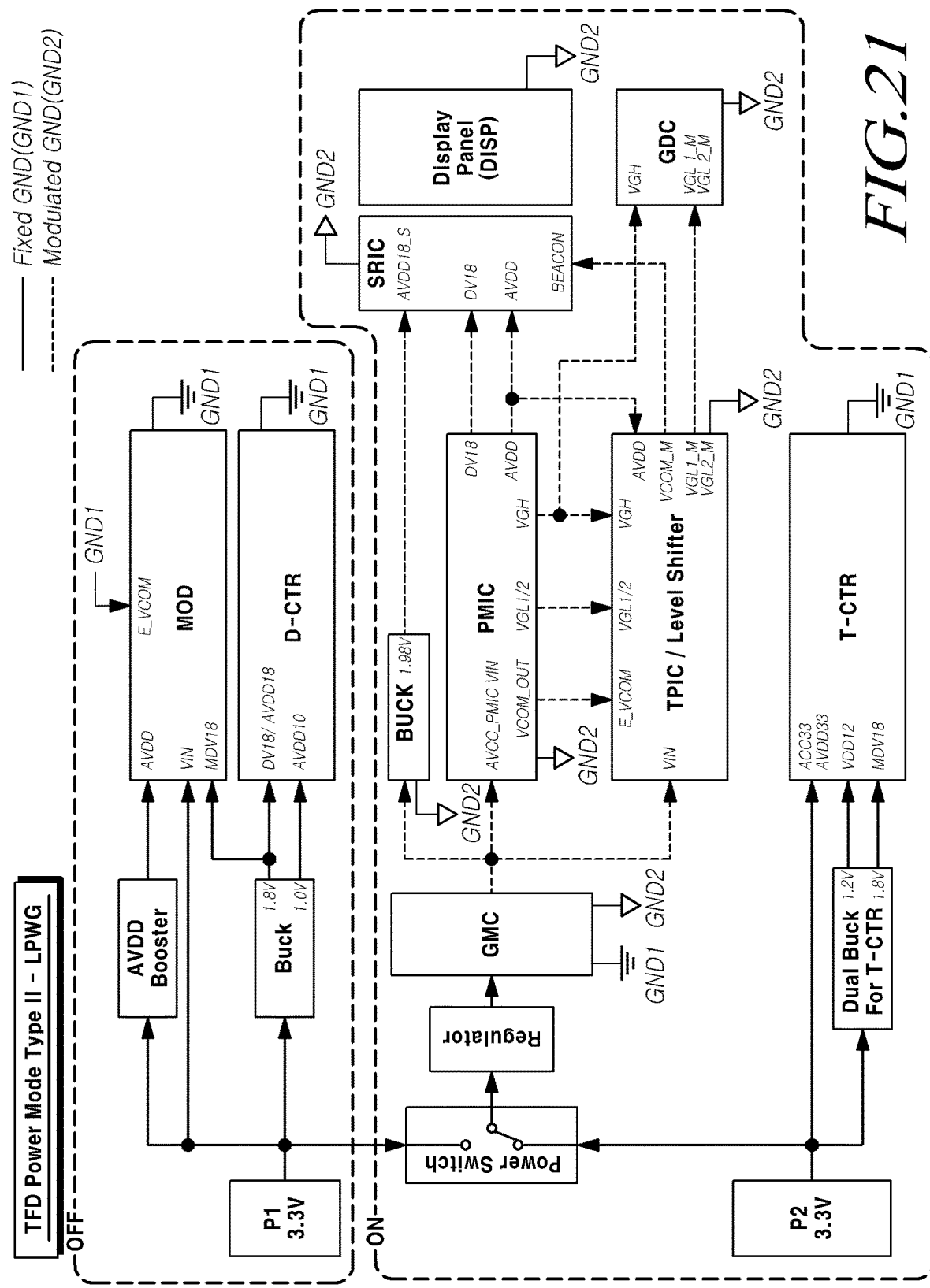
Figure 22:
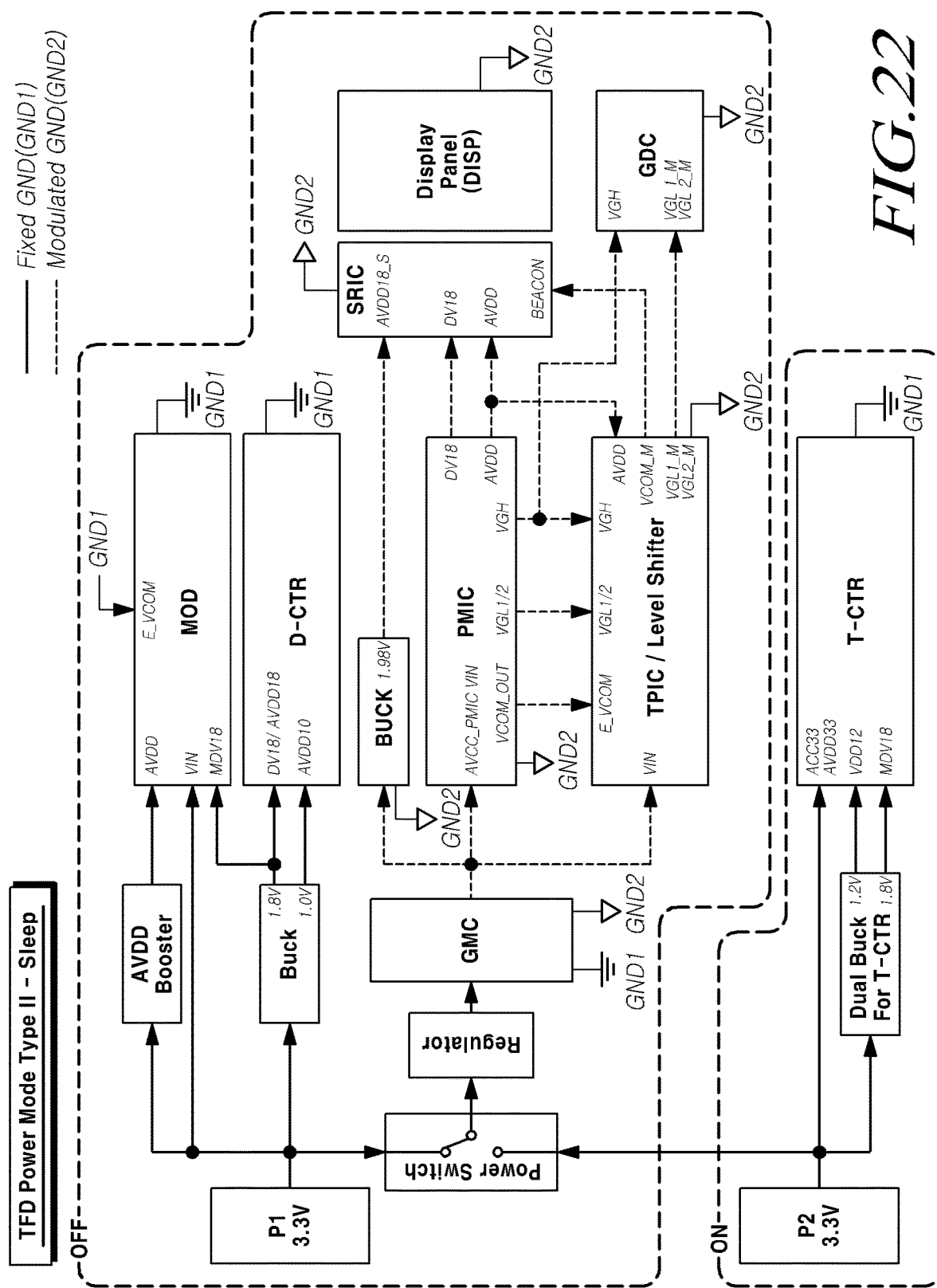

FIGS. 20 to 22 are diagrams illustrating example operating schemes according to driving modes in the touch display device 100 shown in FIG. 19. Here, FIG. 20 represents operating schemes according to the active mode, and FIG. 21 represents operating schemes according to the low power wake-up gesture mode LPWG. FIG. 22 represents operating schemes according to the sleep mode.

Referring to FIG. 20, in the active mode of the touch display device 100 herein, the first power source P1 and the second power source P2 becomes an on-state by the controlling of the system.

The power switch controls the ground modulation circuit GMC to be connected to the first power source P1 in the active mode.

Thus, in addition, the display controller D-CTR and the modulator MOD can be driven by power supplied from the first power source P1. Further, the ground modulation circuit GMC can be driven by the first power source P1.

Further, the power management integrated circuit PMIC, the touch power integrated circuit TPIC, the integrating integrated circuit SRIC, the gate driving circuit GDC, and the like can be driven based on voltages supplied from the ground modulation circuit GMC.

In addition, the touch controller T-CTR can be driven by power supplied from the second power source P2.

Accordingly, in the active mode, display driving and touch driving can be performed based on ground modulation by power supplied from the first power source P1 and power supplied from the second power source P2.

Further, in the low power wake-up gesture mode LPWG, it is possible for the touch display device 100 to reduce power consumption by turning off at least one of power sources.

At this time, by changing a power source for driving the ground modulation control GMC through the controlling of the power switch, in the low power wake-up gesture mode LPWG, the touch sensing can be performed in even a condition of reduced power consumption.

Referring to FIG. 21, in the low power wake-up gesture mode LPWG of the touch display device 100 herein, the first power source P1 can become an off-state by the controlling of the system. The second power source P2 can remain the on-state.

The power switch controls the ground modulation circuit GMC to be connected to the second power source P2 in the low power wake-up gesture mode LPWG.

As the first power source P1 becomes the off-state, the operations of the display controller D-CTR and the modulator MOD, to which power from the first power source P1 is supplied, can be stopped.

Further, since the second power source P2 remains the on-state, the touch controller T-CTR to which power from the second power source P2 is supplied can be driven.

The ground modulation circuit GMC can receive power from the second power source P2 by the controlling of the power switch. Accordingly, the power management integrated circuit PMIC, the touch power integrated circuit TPIC, the integrating integrated circuit SRIC, and the like driven based on voltages supplied from the ground modulation circuit GMC can be driven.

Accordingly, in the low power wake-up gesture mode LPWG, as the display controller D-CTR and the ground modulation circuit GMC are driven based on power supplied from the second power source P2, it is possible to perform touch sensing.

Here, as the modulator MOD stops its operation, the ground modulation circuit GMC can supply the ground voltage based on the first ground voltage Vgnd1 of the first ground GND1.

That is, in the low power wake-up gesture mode LPWG, the power management integrated circuit PMIC, the touch power integrated circuit TPIC, the integrating integrated circuit SRIC, and the like are regarded as being grounded the first ground GND1, and normal touch sensing can be performed since the time interval of this mode is not an time interval performing display driving.

Thus, in the low power wake-up gesture mode LPWG, since the first power source P1 becomes the off-state, it is possible to reduce power consumption of the touch display device 100.

Further, in the low power wake-up gesture mode LPWG, since touch driving can be performed, when a touch on the display panel DISP is detected, it is possible to provide a wake-up function for transitioning from the low power wake-up gesture mode LPWG to the active mode.

That is, when a touch is detected in the low power wake-up gesture mode LPWG, the first power source P1 is transitioned from the off-state to the on-state, and the display controller D-CTR and the like can be driven.

Further, when transitioned into the active mode, the power switch can connect between the ground modulation circuit GMC and the first power source P1; therefore, the ground modulation circuit GMC can be driven by the first power source P1.

Accordingly, by controlling power supplied to the ground modulation circuit GMC through the power switch, in the low power wake-up gesture mode LPWG, the touch driving can be performed in even a condition of reduced power consumption, and a mode transition function can be provided based on the touch sensing.

Further, in a structure including such a power switch, the touch display device 100 can be driven in the sleep mode.

Referring to FIG. 22, in the sleep mode of the touch display device 100 herein, the first power source P1 becomes the off-state by the controlling of the system, and the second power source P2 remains the on-state.

The power switch controls the ground modulation circuit GMC to be connected to the first power source P1 in the sleep mode.

Accordingly, in the sleep mode, the driving of the display controller D-CTR, the modulator MOD, the ground modulation circuit GMC and the like, connected to the first power source P1 is stopped.

Further, only the touch controller T-CTR connected to the second power source P2 can be driven in the sleep mode; therefore, it is possible for the touch display device 100 to reduce standby power consumption.

Thus, in the structure including in the active mode and in the low power wake-up gesture mode LPWG, the touch display device 100 in accordance with embodiments of the present disclosure can be further driven in the sleep mode, the touch display device 100 can be sequentially driven by the low power wake-up gesture mode LPWG and the sleep mode depending on a standby time, or the like of the touch display device 100; it is therefore possible for the touch display device 100 to reduce power consumption efficiently.

The touch display device 100 in accordance with embodiments of the present disclosure performs the display driving and the touch driving based on a ground voltage modulated by the ground modulation circuit GMC; thus, the display driving and the touch driving can be performed simultaneously or together without degrading display driving performance and touch driving performance.

Further, by dividing the power source into two or more power sources for driving the display controller D-CTR, the ground modulation circuit GMC, the touch controller T-CTR, and the like, it is possible for the touch display device 100 to reduce power consumption.

Further, by switching between power sources for driving the ground modulation circuit GMC according to a driving mode, the touch sensing can be performed in a condition of reduced power consumption, and further, power consumption can be minimized. Therefore, it is possible to use power efficiently according to driving states of the touch display device 100.

Although embodiments of the present disclosure have been described for illustrative purposes, those skilled in the art will appreciate that various modifications, additions and substitutions are possible, without departing from the scope and spirit of the disclosure as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device comprising:
   a first power source configured to supply power to a display controller grounded at a first ground;
   a second power source configured to supply power to a touch controller grounded at the first ground;
   at least one driving circuit grounded at a second ground different from the first ground; and
   a ground modulation circuit configured to receive power from the first power source, and apply a modulation signal to the first ground or the second ground so that one of a first ground voltage of the first ground or a second ground voltage of the second ground is modulated in comparison with the other,
   wherein the first power source is in an on-state in a first driving mode and an off-state in a second driving mode, and the second power source is in the on-state in both the first driving mode and the second driving mode, and
   wherein the first driving mode is an active mode, and the second driving mode is a sleep mode.

2. The touch display device according to claim 1, wherein the at least one driving circuit operates based on the second ground voltage of the second ground, and stops its operation in the second driving mode.

3. The touch display device according to claim 1, wherein the at least one driving circuit includes a data driving circuit and a touch driving circuit, and the data driving circuit outputs a data voltage during at least a part of a time interval in which the touch driving circuit outputs a touch driving signal.

4. The touch display device according to claim 3, wherein the touch driving signal corresponds in at least one of a frequency, a phase, a voltage polarity, or an amplitude to the second ground voltage.

5. The touch display device according to claim 3, wherein the data voltage corresponds in at least one of a frequency, a phase, a voltage polarity, or an amplitude to the second ground voltage.

6. The touch display device according to claim 1, further comprising a modulator which is grounded to the first ground, receives power from the first power source, and outputs a reference modulation signal.

7. The touch display device according to claim 6, wherein the ground modulation circuit applies the reference modulation signal outputted from the modulator or a modulated signal obtained by amplifying the reference modulation signal to the first ground or the second ground.

8. A touch display device comprising:
   a first power source configured to supply power to a display controller grounded at a first ground;
   a second power source configured to supply power to a touch controller grounded at the first ground;
   at least one driving circuit grounded at a second ground different from the first ground;
   a ground modulation circuit configured to receive power from the first power source or the second power source, and apply a modulation signal to the first ground or the second ground so that one of a first ground voltage of the first ground or a second ground voltage of the second ground is modulated in comparison with the other; and
   a power switch coupled between the ground modulation circuit and each of the first power source and the second power source,
   wherein the first power source is in an on-state in a first driving mode and an off-state in a second driving mode, and the second power source is in the on-state in both the first driving mode and the second driving mode, and
   wherein the first driving mode is an active mode, and the second driving mode is a sleep mode.

9. The touch display device according to claim 8, wherein the power switch electrically connects the ground modulation circuit to the first power source in the first driving mode, and electrically connects the ground modulation circuit to the second power source in the second driving mode.

10. The touch display device according to claim 9, wherein when a touch is detected by the touch controller in the second driving mode, the power switch electrically connects the ground modulation circuit to the first power source.

11. The touch display device according to claim 8, wherein the first power source is an off-state in a third driving mode, and the second power source is in an on-state in the third driving mode,
    wherein the power switch electrically connects the ground modulation circuit to the first power source in the third driving mode.

12. The touch display device according to claim 8, wherein the at least one driving circuit includes a data driving circuit and a touch driving circuit, and the data driving circuit outputs a data voltage during at least a part of a time interval in which the touch driving circuit outputs a touch driving signal.

13. The touch display device according to claim 12, wherein the touch driving signal corresponds in at least one of a frequency, a phase, a voltage polarity, or an amplitude to the second ground voltage.

14. The touch display device according to claim 12, wherein the data voltage corresponds in at least one of a frequency, a phase, a voltage polarity, or an amplitude to the second ground voltage.

15. The touch display device according to claim 8, further comprising a modulator which is grounded to the first ground, receives power from the first power source, and outputs a reference modulation signal.

16. The touch display device according to claim 15, wherein the ground modulation circuit applies the reference modulation signal outputted from the modulator or a modulated signal obtained by amplifying the reference modulation signal to the first ground or the second ground.

17. A touch display panel comprising:
    a first power source configured to supply power to a display controller grounded at a first ground;
    a second power source configured to supply power to a touch controller grounded at the first ground;
    at least one driving circuit grounded at a second ground different from the first ground;

a ground modulation circuit configured to receive power from the first power source or the second power source, and apply a modulation signal to the first ground or the second ground so that one of a first ground voltage of the first ground or a second ground voltage of the second ground is modulated in comparison with the other; and a power switch coupled between the ground modulation circuit and each of the first power source and the second power source, wherein the first power source is in an on-state in a first driving mode and an off-state in a second driving mode and a third driving mode, and the second power source is in the on-state in all of the first driving mode, the second driving mode, and the third driving mode, wherein the first driving mode is an active mode, the second driving mode is a low power wake-up gesture mode, and the third driving mode is a sleep mode.

18. The touch display device according to claim 17, wherein the power switch electrically connects the ground modulation circuit to the first power source in the first driving mode and the third driving mode, and electrically connects the ground modulation circuit to the second power source in the second driving mode.

19. The touch display device according to claim 18, wherein when a touch is detected by the touch controller in the second driving mode, the power switch electrically connects the ground modulation circuit to the first power source.

* * * * *